US012555438B2

(12) United States Patent
Petersen et al.

(10) Patent No.: US 12,555,438 B2
(45) Date of Patent: *Feb. 17, 2026

(54) SYSTEM AND METHOD FOR UTILIZING VIRTUAL TICKET VOUCHERS

(71) Applicant: IGT, Las Vegas, NV (US)

(72) Inventors: Erik Petersen, Reno, NV (US); Kevin Higgins, Reno, NV (US); Adrian Marcu, Lafayette, CA (US)

(73) Assignee: IGT, Las Vegas, NV (US)

( * ) Notice: Subject to any disclaimer, the term of this patent is extended or adjusted under 35 U.S.C. 154(b) by 198 days.

This patent is subject to a terminal disclaimer.

(21) Appl. No.: 18/529,752

(22) Filed: Dec. 5, 2023

(65) Prior Publication Data

US 2024/0105006 A1 Mar. 28, 2024

Related U.S. Application Data

(63) Continuation of application No. 17/195,195, filed on Mar. 8, 2021, now Pat. No. 11,854,346, which is a continuation of application No. 15/850,605, filed on Dec. 21, 2017, now Pat. No. 10,950,088.

(51) Int. Cl.
*G07F 17/00* (2006.01)
*G07F 17/32* (2006.01)

(52) U.S. Cl.
CPC ...... *G07F 17/3251* (2013.01); *G07F 17/3223* (2013.01); *G07F 17/3225* (2013.01)

(58) Field of Classification Search
CPC ............. G07F 17/3251; G07F 17/3223; G07F 17/3225
USPC ........................................................ 463/25
See application file for complete search history.

(56) References Cited

U.S. PATENT DOCUMENTS

| | | | |
|---|---|---|---|
| 3,662,105 | A | 5/1972 | Hurst |
| 4,071,689 | A | 1/1978 | Talmage |
| 4,072,930 | A | 2/1978 | Lucero |
| D247,828 | S | 5/1978 | Moore et al. |
| 4,159,054 | A | 6/1979 | Yoshida |
| 4,283,709 | A | 8/1981 | Lucero |
| 4,339,709 | A | 7/1982 | Brihier |
| 4,339,798 | A | 7/1982 | Hedges |
| 4,553,222 | A | 11/1985 | Kurland |
| 4,856,787 | A | 8/1989 | Itkis |
| 5,038,022 | A | 8/1991 | Lucero |
| 5,042,809 | A | 8/1991 | Richardson |

(Continued)

FOREIGN PATENT DOCUMENTS

| | | |
|---|---|---|
| EA | 008726 | 8/2007 |
| EP | 1895483 | 3/2008 |

(Continued)

OTHER PUBLICATIONS

EZ Pay® Card Accounts Advertisement, written by IGT, published in 2013 (1 page).

(Continued)

*Primary Examiner* — Daniel A Hess
(74) *Attorney, Agent, or Firm* — Neal, Gerber & Eisenberg LLP

(57) ABSTRACT

The present disclosure relates generally to a system that utilizes virtual ticket vouchers in association with one or more transactions involving one or more components of a gaming establishment ecosystem.

20 Claims, 7 Drawing Sheets

(56) References Cited

U.S. PATENT DOCUMENTS

| | | | |
|---|---|---|---|
| 5,048,831 | A | 9/1991 | Sides |
| 5,179,517 | A | 1/1993 | Sarbin |
| 5,221,838 | A | 6/1993 | Gutman |
| 5,265,874 | A | 11/1993 | Dickinson et al. |
| 5,287,269 | A | 2/1994 | Dorrough et al. |
| 5,290,033 | A | 3/1994 | Bittner et al. |
| 5,371,345 | A | 12/1994 | Lestrange |
| D359,765 | S | 6/1995 | Izawa |
| 5,429,361 | A | 7/1995 | Raven |
| 5,457,306 | A | 10/1995 | Lucero |
| 5,470,079 | A | 11/1995 | LeStrange et al. |
| 5,483,049 | A | 1/1996 | Schulze, Jr. |
| 5,559,312 | A | 9/1996 | Lucero |
| 5,618,045 | A | 4/1997 | Kagan |
| 5,643,086 | A | 7/1997 | Alcorn |
| 5,655,961 | A | 8/1997 | Acres |
| 5,676,231 | A | 10/1997 | Legras |
| 5,702,304 | A | 12/1997 | Acres |
| 5,718,632 | A | 2/1998 | Hayashi |
| 5,741,183 | A | 4/1998 | Acres |
| 5,759,102 | A | 6/1998 | Pease |
| 5,761,647 | A | 6/1998 | Boushy |
| 5,768,382 | A | 6/1998 | Schneier |
| 5,769,716 | A | 6/1998 | Saffari |
| 5,770,533 | A | 6/1998 | Franchi |
| 5,779,545 | A | 7/1998 | Berg |
| 5,788,573 | A | 8/1998 | Baerlocher |
| 5,795,228 | A | 8/1998 | Trumbull |
| 5,796,389 | A | 8/1998 | Bertram |
| 5,797,085 | A | 8/1998 | Beuk |
| 5,809,482 | A | 9/1998 | Strisower |
| 5,811,772 | A | 9/1998 | Lucero |
| 5,816,918 | A | 10/1998 | Kelly |
| 5,818,019 | A | 10/1998 | Irwin, Jr. |
| 5,833,536 | A | 11/1998 | Davids |
| 5,833,540 | A | 11/1998 | Miodunski |
| 5,836,819 | A | 11/1998 | Ugawa |
| 5,851,148 | A | 12/1998 | Brune |
| 5,871,398 | A | 2/1999 | Schneier |
| D406,612 | S | 3/1999 | Johnson |
| 5,885,158 | A | 3/1999 | Torango |
| 5,919,091 | A | 7/1999 | Bell |
| 5,943,624 | A | 8/1999 | Fox et al. |
| 5,951,397 | A | 9/1999 | Dickinson |
| 5,952,640 | A | 9/1999 | Lucero |
| 5,954,583 | A | 9/1999 | Green |
| 5,957,776 | A | 9/1999 | Hoehne |
| 5,959,277 | A | 9/1999 | Lucero |
| 5,967,896 | A | 10/1999 | Jorasch |
| 5,971,271 | A | 10/1999 | Wynn |
| 5,984,779 | A | 11/1999 | Bridgeman |
| 5,999,808 | A | 12/1999 | Ladue |
| 6,001,016 | A | 12/1999 | Walker |
| 6,003,013 | A | 12/1999 | Boushy |
| 6,003,651 | A | 12/1999 | Waller |
| 6,010,404 | A | 1/2000 | Walker |
| 6,012,832 | A | 1/2000 | Saunders |
| 6,012,983 | A | 1/2000 | Walker |
| 6,019,283 | A | 2/2000 | Lucero |
| 6,038,666 | A | 3/2000 | Hsu |
| 6,048,269 | A | 4/2000 | Burns |
| 6,050,895 | A | 4/2000 | Luciano |
| 6,062,981 | A | 5/2000 | Luciano |
| 6,068,552 | A | 5/2000 | Walker |
| 6,077,163 | A | 6/2000 | Walker |
| 6,089,975 | A | 7/2000 | Dunn |
| 6,099,408 | A | 8/2000 | Schneier |
| 6,104,815 | A | 8/2000 | Alcorn |
| 6,106,396 | A | 8/2000 | Alcorn |
| 6,110,041 | A | 8/2000 | Walker et al. |
| 6,113,492 | A | 9/2000 | Walker |
| 6,113,493 | A | 9/2000 | Walker |
| 6,113,495 | A | 9/2000 | Walker |
| 6,135,884 | A | 10/2000 | Hedrick |
| 6,135,887 | A | 10/2000 | Pease |
| 6,139,431 | A | 10/2000 | Walker |
| 6,141,711 | A | 10/2000 | Shah |
| 6,142,369 | A | 11/2000 | Jonstromer |
| 6,149,522 | A | 11/2000 | Alcorn |
| 6,161,059 | A | 12/2000 | Tedesco |
| 6,162,121 | A | 12/2000 | Morro |
| 6,162,122 | A | 12/2000 | Acres |
| 6,174,234 | B1 | 1/2001 | Seibert, Jr. |
| 6,182,221 | B1 | 1/2001 | Hsu |
| 6,183,362 | B1 | 2/2001 | Boushy |
| 6,190,256 | B1 | 2/2001 | Walker |
| 6,206,283 | B1 | 3/2001 | Bansal |
| 6,210,279 | B1 | 4/2001 | Dickinson |
| 6,223,166 | B1 | 4/2001 | Kay |
| 6,227,972 | B1 | 5/2001 | Walker |
| 6,244,958 | B1 | 6/2001 | Acres |
| 6,247,643 | B1 | 6/2001 | Lucero |
| 6,253,119 | B1 | 6/2001 | Dabrowski |
| 6,264,560 | B1 | 7/2001 | Goldberg |
| 6,264,561 | B1 | 7/2001 | Saffari |
| 6,267,671 | B1 | 7/2001 | Hogan |
| 6,270,410 | B1 | 8/2001 | Demar |
| 6,280,328 | B1 | 8/2001 | Holch |
| 6,285,868 | B1 | 9/2001 | Ladue |
| 6,293,866 | B1 | 9/2001 | Walker |
| 6,302,790 | B1 | 10/2001 | Brossard |
| 6,307,956 | B1 | 10/2001 | Black |
| 6,319,125 | B1 | 11/2001 | Acres |
| 6,341,353 | B1 | 1/2002 | Herman |
| 6,368,216 | B1 | 4/2002 | Hedrick |
| 6,371,852 | B1 | 4/2002 | Acres |
| 6,378,073 | B1 | 4/2002 | Davis |
| 6,379,246 | B1 | 4/2002 | Dabrowski |
| 6,383,076 | B1 | 5/2002 | Tiedeken |
| 6,409,595 | B1 | 6/2002 | Uihlein |
| 6,409,602 | B1 | 6/2002 | Wiltshire |
| 6,443,843 | B1 | 9/2002 | Walker |
| 6,450,885 | B2 | 9/2002 | Schneier |
| 6,488,585 | B1 | 12/2002 | Wells |
| 6,496,928 | B1 | 12/2002 | Deo |
| 6,530,835 | B1 | 3/2003 | Walker |
| 6,561,903 | B2 | 5/2003 | Walker |
| 6,581,161 | B1 | 6/2003 | Byford |
| 6,582,310 | B1 | 6/2003 | Walker |
| 6,585,598 | B2 | 7/2003 | Nguyen |
| 6,628,939 | B2 | 9/2003 | Paulsen |
| 6,634,550 | B1 | 10/2003 | Walker et al. |
| 6,648,761 | B1 | 11/2003 | Izawa et al. |
| 6,676,522 | B2 | 1/2004 | Rowe et al. |
| 6,682,421 | B1 | 1/2004 | Rowe |
| 6,685,567 | B2 | 2/2004 | Cockerille |
| 6,702,670 | B2 | 3/2004 | Jasper et al. |
| 6,712,191 | B2 | 3/2004 | Hand |
| D488,512 | S | 4/2004 | Knobel |
| D490,473 | S | 5/2004 | Knobel |
| 6,739,975 | B2 | 5/2004 | Nguyen |
| 6,758,393 | B1 | 7/2004 | Luciano |
| 6,800,029 | B2 | 10/2004 | Rowe |
| 6,831,682 | B1 | 12/2004 | Silverbrook et al. |
| 6,846,238 | B2 | 1/2005 | Wells |
| 6,869,362 | B2 | 3/2005 | Walker |
| 6,880,079 | B2 | 4/2005 | Kefford |
| 6,896,618 | B2 | 5/2005 | Benoy |
| 6,905,411 | B2 | 6/2005 | Nguyen et al. |
| 6,935,957 | B1 | 8/2005 | Yates et al. |
| 6,969,319 | B2 | 11/2005 | Rowe et al. |
| 7,004,388 | B2 | 2/2006 | Kohta |
| 7,004,837 | B1 | 2/2006 | Crowder et al. |
| D523,482 | S | 6/2006 | Uemizo |
| 7,153,210 | B2 | 12/2006 | Yamagishi |
| 7,167,724 | B2 | 1/2007 | Yamagishi |
| 7,169,052 | B2 | 1/2007 | Beaulieu et al. |
| 7,213,750 | B1 | 5/2007 | Barnes et al. |
| D547,806 | S | 7/2007 | Uemizo |
| 7,275,991 | B2 | 10/2007 | Burns |
| 7,331,520 | B2 | 2/2008 | Silva |
| 7,335,106 | B2 | 2/2008 | Johnson |
| 7,337,330 | B2 | 2/2008 | Gatto |
| 7,341,522 | B2 | 3/2008 | Yamagishi |

(56) References Cited

U.S. PATENT DOCUMENTS 7,403,788 B2 7/2008 Trioano et al.
7,416,485 B2 8/2008 Walker
7,419,428 B2 9/2008 Rowe
7,467,999 B2 12/2008 Walker
7,477,889 B2 1/2009 Kim
7,510,474 B2 3/2009 Carter, Sr.
7,545,522 B1 6/2009 Lou
7,552,341 B2 6/2009 Chen
7,594,855 B2 9/2009 Meyerhofer
7,611,409 B2 11/2009 Muir et al.
7,644,861 B2 1/2010 Alderucci
7,693,306 B2 4/2010 Huber
7,699,703 B2 4/2010 Muir
7,701,344 B2 4/2010 Mattice et al.
7,753,789 B2 7/2010 Walker et al.
7,758,420 B2 7/2010 Saffari
7,771,271 B2 8/2010 Walker et al.
7,785,193 B2 8/2010 Paulsen et al.
7,803,053 B2 9/2010 Atkinson
D628,576 S 12/2010 Daniel
7,846,017 B2 12/2010 Walker et al.
7,850,522 B2 12/2010 Walker et al.
7,883,417 B2 2/2011 Bruzzese
7,950,996 B2 5/2011 Nguyen et al.
7,988,550 B2 8/2011 White
7,997,972 B2 8/2011 Nguyen et al.
8,016,666 B2 9/2011 Angell et al.
8,023,133 B2 9/2011 Kaneko
8,038,527 B2 10/2011 Walker et al.
8,057,303 B2 11/2011 Rasmussen
8,079,904 B2 12/2011 Griswold
8,096,872 B2 1/2012 Walker et al.
8,118,668 B2 2/2012 Gagner et al.
8,144,356 B2 3/2012 Meyerhofer
8,157,642 B2 4/2012 Paulsen
8,192,276 B2 6/2012 Walker et al.
8,219,129 B2 7/2012 Brown
8,220,019 B2 7/2012 Stearns et al.
8,241,127 B2 8/2012 Kovacs
8,282,465 B2 10/2012 Giobbi
8,282,490 B2 10/2012 Arezina
8,286,856 B2 10/2012 Meyerhofer et al.
8,393,955 B2 3/2013 Arezina et al.
8,419,548 B2 4/2013 Gagner
8,469,800 B2 6/2013 Lemay et al.
8,512,144 B2 8/2013 Johnson et al.
8,550,903 B2 10/2013 Lyons
8,597,108 B2 12/2013 Nguyen
8,597,111 B2 12/2013 Lemay et al.
8,602,875 B2 12/2013 Nguyen
8,608,569 B2 12/2013 Carrico
8,613,659 B2 12/2013 Nelson
8,613,668 B2 12/2013 Nelson et al.
8,622,836 B2 1/2014 Nelson et al.
8,721,434 B2 5/2014 Nelson et al.
8,734,236 B2 5/2014 Arezina et al.
8,814,683 B2 8/2014 Hollander et al.
8,827,813 B2 9/2014 Lemay et al.
8,827,814 B2 9/2014 Lemay et al.
8,876,595 B2 11/2014 Nelson et al.
8,932,140 B2 1/2015 Gagner et al.
8,956,222 B2 2/2015 Lemay et al.
8,961,306 B2 2/2015 Lemay
8,978,868 B2 3/2015 Johnson et al.
9,011,236 B2 4/2015 Nelson et al.
9,153,095 B2 10/2015 Adiraju et al.
9,367,835 B2 6/2016 Nelson et al.
10,950,088 B2 3/2021 Petersen
11,854,346 B2 * 12/2023 Petersen ............. G07F 17/3251
2001/0039204 A1 11/2001 Tanskanen
2001/0044337 A1 11/2001 Rowe
2002/0020603 A1 2/2002 Jones
2002/0061778 A1 5/2002 Acres
2002/0077182 A1 6/2002 Swanberg
2002/0082070 A1 6/2002 Macke et al.
2002/0087641 A1 7/2002 Levosky
2002/0090986 A1 7/2002 Cote et al.
2002/0094869 A1 7/2002 Harkham
2002/0107066 A1 8/2002 Seelig
2002/0111206 A1 8/2002 Van Baltz et al.
2002/0111209 A1 8/2002 Walker
2002/0132666 A1 9/2002 Lind
2002/0145035 A1 10/2002 Jones
2002/0147047 A1 10/2002 Letovsky
2002/0147049 A1 10/2002 Carter, Sr.
2002/0163570 A1 11/2002 Phillips
2002/0169623 A1 11/2002 Call et al.
2002/0183046 A1 12/2002 Joyce et al.
2002/0196342 A1 12/2002 Walker
2003/0003988 A1 1/2003 Walker
2003/0008707 A1 1/2003 Walker et al.
2003/0027632 A1 2/2003 Sines
2003/0032485 A1 2/2003 Cockerille
2003/0045354 A1 3/2003 Giobbi
2003/0054868 A1 3/2003 Paulsen et al.
2003/0054881 A1 3/2003 Hedrick
2003/0064805 A1 4/2003 Wells
2003/0074259 A1 4/2003 Slyman et al.
2003/0083126 A1 5/2003 Paulsen
2003/0083943 A1 5/2003 Adams
2003/0092477 A1 5/2003 Luciano et al.
2003/0104865 A1 6/2003 Itkis
2003/0141359 A1 7/2003 Dymovsky
2003/0144052 A1 7/2003 Walker
2003/0148812 A1 8/2003 Paulsen
2003/0162591 A1 8/2003 Nguyen et al.
2003/0172037 A1 9/2003 Jung
2003/0186739 A1 10/2003 Paulsen et al.
2003/0199321 A1 10/2003 Williams
2003/0203756 A1 10/2003 Jackson
2003/0224852 A1 12/2003 Walker
2003/0228900 A1 12/2003 Yamagishi
2004/0014514 A1 1/2004 Yacenda
2004/0016797 A1 1/2004 Jones
2004/0023721 A1 2/2004 Giobbi
2004/0039635 A1 2/2004 Linde
2004/0043814 A1 3/2004 Angell et al.
2004/0085293 A1 5/2004 Soper
2004/0088250 A1 5/2004 Bartter et al.
2004/0106454 A1 6/2004 Walker
2004/0127277 A1 7/2004 Walker
2004/0129773 A1 7/2004 Lute, Jr.
2004/0147314 A1 7/2004 Lemay
2004/0185935 A1 9/2004 Yamagishi
2004/0190042 A1 9/2004 Ferlitsch et al.
2004/0192434 A1 9/2004 Walker
2004/0199284 A1 10/2004 Hara
2004/0209690 A1 10/2004 Bruzzese
2004/0225565 A1 11/2004 Selman
2004/0230527 A1 11/2004 Hansen et al.
2004/0259640 A1 12/2004 Gentles
2004/0266395 A1 12/2004 Pailles
2005/0014554 A1 1/2005 Walker
2005/0020354 A1 1/2005 Nguyen et al.
2005/0049049 A1 3/2005 Griswold et al.
2005/0054438 A1 3/2005 Rothschild
2005/0059485 A1 3/2005 Paulsen
2005/0070257 A1 3/2005 Saarinen
2005/0076242 A1 4/2005 Breuer
2005/0101383 A1 5/2005 Wells
2005/0130728 A1 6/2005 Nguyen
2005/0173220 A1 8/2005 Liu et al.
2005/0227770 A1 10/2005 Papulov
2005/0240484 A1 10/2005 Yan
2005/0255911 A1 11/2005 Nguyen et al.
2005/0287852 A1 12/2005 Sugawara
2006/0018450 A1 1/2006 Sandberg-Diment
2006/0025206 A1 2/2006 Walker
2006/0025222 A1 2/2006 Sekine
2006/0035707 A1 2/2006 Nguyen
2006/0040741 A1 2/2006 Griswold
2006/0046823 A1 3/2006 Kaminkow
2006/0046834 A1 3/2006 Sekine
2006/0046842 A1 3/2006 Mattice

(56) References Cited

U.S. PATENT DOCUMENTS

| | | | |
|---|---|---|---|
| 2006/0046855 | A1 | 3/2006 | Nguyen et al. |
| 2006/0049624 | A1 | 3/2006 | Brosnan et al. |
| 2006/0064372 | A1 | 3/2006 | Gupta |
| 2006/0079333 | A1 | 4/2006 | Morrow |
| 2006/0089174 | A1 | 4/2006 | Twerdahl |
| 2006/0118382 | A1 | 6/2006 | Yoshioka |
| 2006/0160621 | A1 | 7/2006 | Rowe et al. |
| 2006/0165060 | A1 | 7/2006 | Dua |
| 2006/0166732 | A1 | 7/2006 | Lechner et al. |
| 2006/0166741 | A1 | 7/2006 | Boyd et al. |
| 2006/0173781 | A1 | 8/2006 | Donner |
| 2006/0189382 | A1 | 8/2006 | Muir |
| 2006/0223627 | A1 | 10/2006 | Nozaki |
| 2006/0226598 | A1 | 10/2006 | Walker |
| 2006/0246981 | A1 | 11/2006 | Walker et al. |
| 2006/0247037 | A1 | 11/2006 | Park |
| 2006/0258439 | A1 | 11/2006 | White |
| 2006/0266598 | A1 | 11/2006 | Baumgartner et al. |
| 2006/0271433 | A1 | 11/2006 | Hughes |
| 2006/0279781 | A1 | 12/2006 | Kaneko |
| 2006/0281554 | A1 | 12/2006 | Gatto et al. |
| 2006/0287072 | A1 | 12/2006 | Walker |
| 2006/0287098 | A1 | 12/2006 | Morrow et al. |
| 2007/0017979 | A1 | 1/2007 | Wu et al. |
| 2007/0021198 | A1 | 1/2007 | Muir |
| 2007/0060302 | A1 | 3/2007 | Fabbri |
| 2007/0060372 | A1 | 3/2007 | Yamagishi |
| 2007/0117608 | A1 | 5/2007 | Roper et al. |
| 2007/0117623 | A1 | 5/2007 | Nelson |
| 2007/0129150 | A1 | 6/2007 | Crowder et al. |
| 2007/0129151 | A1 | 6/2007 | Crowder et al. |
| 2007/0155469 | A1 | 7/2007 | Johnson |
| 2007/0159301 | A1 | 7/2007 | Hirt |
| 2007/0174809 | A1 | 7/2007 | Brown |
| 2007/0190494 | A1 | 8/2007 | Rosenberg |
| 2007/0197247 | A1 | 8/2007 | Inselberg |
| 2007/0202941 | A1 | 8/2007 | Miltenberger et al. |
| 2007/0218971 | A1 | 9/2007 | Berube |
| 2007/0218985 | A1 | 9/2007 | Okada |
| 2007/0218991 | A1 | 9/2007 | Okada |
| 2007/0238505 | A1 | 10/2007 | Okada |
| 2007/0243928 | A1 | 10/2007 | Iddings |
| 2007/0267488 | A1 | 11/2007 | Chang |
| 2008/0011832 | A1 | 1/2008 | Chang |
| 2008/0026816 | A1 | 1/2008 | Sammon |
| 2008/0026823 | A1 | 1/2008 | Wolf et al. |
| 2008/0026844 | A1 | 1/2008 | Wells |
| 2008/0070671 | A1 | 3/2008 | Okada |
| 2008/0076528 | A1 | 3/2008 | Nguyen et al. |
| 2008/0076572 | A1 | 3/2008 | Nguyen et al. |
| 2008/0085753 | A1 | 4/2008 | Okada |
| 2008/0139306 | A1 | 6/2008 | Lutnick |
| 2008/0166997 | A1 | 7/2008 | Sun et al. |
| 2008/0182644 | A1 | 7/2008 | Lutnick et al. |
| 2008/0200240 | A1 | 8/2008 | Saltiel et al. |
| 2008/0200251 | A1 | 8/2008 | Alderucci et al. |
| 2008/0207296 | A1 | 8/2008 | Lutnick et al. |
| 2008/0213026 | A1 | 9/2008 | Grabiec |
| 2008/0220878 | A1 | 9/2008 | Michaelis |
| 2008/0234028 | A1 | 9/2008 | Meyer et al. |
| 2008/0261682 | A1 | 10/2008 | Phillips |
| 2008/0268934 | A1 | 10/2008 | Mattice et al. |
| 2008/0270302 | A1 | 10/2008 | Beenau et al. |
| 2008/0293483 | A1 | 11/2008 | Pickus |
| 2008/0300047 | A1 | 12/2008 | Nagano |
| 2008/0300061 | A1 | 12/2008 | Zheng |
| 2008/0305860 | A1 | 12/2008 | Linner |
| 2008/0305862 | A1 | 12/2008 | Walker et al. |
| 2008/0305873 | A1 | 12/2008 | Zheng |
| 2008/0311971 | A1 | 12/2008 | Dean |
| 2008/0318655 | A1 | 12/2008 | Davies |
| 2009/0011821 | A1 | 1/2009 | Griswold |
| 2009/0023490 | A1 | 1/2009 | Moshal |
| 2009/0029766 | A1 | 1/2009 | Lutnick |
| 2009/0054149 | A1 | 2/2009 | Brosnan et al. |
| 2009/0098943 | A1 | 4/2009 | Weber et al. |
| 2009/0124350 | A1 | 5/2009 | Iddings et al. |
| 2009/0124376 | A1 | 5/2009 | Kelly et al. |
| 2009/0125429 | A1 | 5/2009 | Takayama |
| 2009/0131134 | A1 | 5/2009 | Baerlocher et al. |
| 2009/0131146 | A1 | 5/2009 | Arezina et al. |
| 2009/0158400 | A1 | 6/2009 | Miyake |
| 2009/0186680 | A1 | 7/2009 | Napolitano |
| 2009/0197684 | A1 | 8/2009 | Arezina |
| 2009/0227317 | A1 | 9/2009 | Spangler |
| 2009/0233715 | A1 | 9/2009 | Ergen |
| 2009/0275397 | A1 | 11/2009 | Van Baltz et al. |
| 2009/0313084 | A1 | 12/2009 | Chugh |
| 2009/0328144 | A1 | 12/2009 | Sherlock et al. |
| 2010/0012715 | A1 | 1/2010 | Williams |
| 2010/0016075 | A1 | 1/2010 | Thomas |
| 2010/0029376 | A1 | 2/2010 | Hardy et al. |
| 2010/0036758 | A1 | 2/2010 | Monk |
| 2010/0048291 | A1 | 2/2010 | Warkentin |
| 2010/0048297 | A1 | 2/2010 | Dasgupta |
| 2010/0062840 | A1 | 3/2010 | Herrmann |
| 2010/0069160 | A1 | 3/2010 | Barrett |
| 2010/0087241 | A1 | 4/2010 | Nguyen |
| 2010/0087249 | A1 | 4/2010 | Rowe |
| 2010/0093421 | A1 | 4/2010 | Nyman |
| 2010/0093429 | A1 | 4/2010 | Mattice |
| 2010/0094734 | A1 | 4/2010 | Wang |
| 2010/0113061 | A1 | 5/2010 | Holcman |
| 2010/0113161 | A1 | 5/2010 | Walker |
| 2010/0155462 | A1 | 6/2010 | Morrison et al. |
| 2010/0173691 | A1 | 7/2010 | Wolfe |
| 2010/0174650 | A1 | 7/2010 | Nonaka |
| 2010/0178986 | A1 | 7/2010 | Davis et al. |
| 2010/0219234 | A1 | 9/2010 | Forbes |
| 2010/0222100 | A1 | 9/2010 | Dragt |
| 2010/0225653 | A1 | 9/2010 | Sao et al. |
| 2010/0227670 | A1 | 9/2010 | Arezina et al. |
| 2010/0234099 | A1 | 9/2010 | Rasmussen |
| 2010/0250787 | A1 | 9/2010 | Miyata |
| 2010/0304848 | A1 | 12/2010 | Detlefsen |
| 2010/0323785 | A1 | 12/2010 | Motyl |
| 2010/0323789 | A1 | 12/2010 | Gabriele |
| 2010/0331079 | A1 | 12/2010 | Bytnar |
| 2011/0015976 | A1 | 1/2011 | Lempel et al. |
| 2011/0028199 | A1 | 2/2011 | Luciano et al. |
| 2011/0035319 | A1 | 2/2011 | Brand et al. |
| 2011/0057028 | A1 | 3/2011 | Schwartz |
| 2011/0065496 | A1 | 3/2011 | Gagner et al. |
| 2011/0065497 | A1 | 3/2011 | Patterson, Jr. |
| 2011/0070940 | A1 | 3/2011 | Jaffe |
| 2011/0076963 | A1 | 3/2011 | Hatano |
| 2011/0086691 | A1 | 4/2011 | Luciano et al. |
| 2011/0086696 | A1 | 4/2011 | Macewan |
| 2011/0098104 | A1 | 4/2011 | Meyerhofer |
| 2011/0118008 | A1 | 5/2011 | Taylor |
| 2011/0119098 | A1 | 5/2011 | Miller |
| 2011/0136576 | A1 | 6/2011 | Kammler et al. |
| 2011/0166989 | A1 | 7/2011 | Ross et al. |
| 2011/0207531 | A1 | 8/2011 | Gagner |
| 2011/0208418 | A1 | 8/2011 | Looney et al. |
| 2011/0242565 | A1 | 10/2011 | Armstrong |
| 2011/0263325 | A1 | 10/2011 | Atkinson |
| 2011/0287823 | A1 | 11/2011 | Guinn et al. |
| 2011/0295668 | A1 | 12/2011 | Charania |
| 2011/0306400 | A1 | 12/2011 | Nguyen |
| 2011/0306401 | A1 | 12/2011 | Nguyen |
| 2011/0307318 | A1 | 12/2011 | Laporte et al. |
| 2011/0314153 | A1 | 12/2011 | Bathiche |
| 2012/0015735 | A1 | 1/2012 | Abouchar |
| 2012/0046110 | A1 | 2/2012 | Amaitis |
| 2012/0047008 | A1 | 2/2012 | Alhadeff et al. |
| 2012/0066048 | A1 | 3/2012 | Foust et al. |
| 2012/0067944 | A1 | 3/2012 | Ross |
| 2012/0072111 | A1 | 3/2012 | Davis |
| 2012/0084131 | A1 | 4/2012 | Bergel et al. |
| 2012/0094757 | A1 | 4/2012 | Vago |
| 2012/0115593 | A1 | 5/2012 | Vann et al. |
| 2012/0122584 | A1 | 5/2012 | Nguyen |
| 2012/0122585 | A1 | 5/2012 | Nguyen |

(56) References Cited

U.S. PATENT DOCUMENTS

| | | | |
|---|---|---|---|
| 2012/0129586 | A1 | 5/2012 | Lutnick |
| 2012/0129611 | A1 | 5/2012 | Rasmussen |
| 2012/0149561 | A1 | 6/2012 | Ribi et al. |
| 2012/0187187 | A1 | 7/2012 | Duff |
| 2012/0190455 | A1 | 7/2012 | Briggs |
| 2012/0208627 | A1 | 8/2012 | Kitakaze et al. |
| 2012/0221474 | A1 | 8/2012 | Eicher et al. |
| 2012/0239552 | A1 | 9/2012 | Harycki |
| 2012/0252556 | A1 | 10/2012 | Doyle et al. |
| 2012/0265681 | A1 | 10/2012 | Ross |
| 2012/0276990 | A1 | 11/2012 | Arezina |
| 2012/0290336 | A1 | 11/2012 | Rosenblatt |
| 2012/0296174 | A1 | 11/2012 | McCombie |
| 2012/0300753 | A1 | 11/2012 | Brown |
| 2012/0311322 | A1 | 12/2012 | Koyun |
| 2012/0315984 | A1 | 12/2012 | Carrico et al. |
| 2012/0324135 | A1 | 12/2012 | Goodman |
| 2013/0013389 | A1 | 1/2013 | Vitti et al. |
| 2013/0017877 | A1 | 1/2013 | Dahl |
| 2013/0017884 | A1 | 1/2013 | Price |
| 2013/0023339 | A1 | 1/2013 | Davis |
| 2013/0053133 | A1 | 2/2013 | Schueller |
| 2013/0053136 | A1 | 2/2013 | Lemay et al. |
| 2013/0053148 | A1 | 2/2013 | Nelson et al. |
| 2013/0065667 | A1 | 3/2013 | Nelson et al. |
| 2013/0065668 | A1 | 3/2013 | Lemay et al. |
| 2013/0065678 | A1 | 3/2013 | Nelson et al. |
| 2013/0065686 | A1 | 3/2013 | Lemay et al. |
| 2013/0085943 | A1 | 4/2013 | Takeda et al. |
| 2013/0090155 | A1 | 4/2013 | Johnson |
| 2013/0124413 | A1 | 5/2013 | Itwaru |
| 2013/0130777 | A1 | 5/2013 | Lemay et al. |
| 2013/0130778 | A1 | 5/2013 | Anderson et al. |
| 2013/0137509 | A1 | 5/2013 | Weber et al. |
| 2013/0137510 | A1 | 5/2013 | Weber et al. |
| 2013/0137516 | A1 | 5/2013 | Griswold et al. |
| 2013/0165199 | A1 | 6/2013 | Lemay |
| 2013/0165208 | A1 | 6/2013 | Nelson |
| 2013/0165209 | A1 | 6/2013 | Lemay |
| 2013/0165210 | A1 | 6/2013 | Nelson |
| 2013/0165231 | A1 | 6/2013 | Nelson |
| 2013/0165232 | A1 | 6/2013 | Nelson |
| 2013/0190077 | A1 | 7/2013 | Arezina et al. |
| 2013/0196755 | A1 | 8/2013 | Nelson |
| 2013/0225279 | A1 | 8/2013 | Patceg et al. |
| 2013/0244772 | A1 | 9/2013 | Weber |
| 2013/0252713 | A1 | 9/2013 | Nelson |
| 2013/0260889 | A1 | 10/2013 | Lemay et al. |
| 2013/0275314 | A1 | 10/2013 | Bowles |
| 2013/0299574 | A1 | 11/2013 | Theobald |
| 2013/0316808 | A1 | 11/2013 | Nelson |
| 2013/0317987 | A1 | 11/2013 | Tsutsui |
| 2013/0324237 | A1 | 12/2013 | Adiraju et al. |
| 2013/0337890 | A1 | 12/2013 | Earley et al. |
| 2013/0344942 | A1 | 12/2013 | Price et al. |
| 2014/0018153 | A1 | 1/2014 | Nelson et al. |
| 2014/0045586 | A1 | 2/2014 | Allen et al. |
| 2014/0080578 | A1 | 3/2014 | Nguyen |
| 2014/0087865 | A1 | 3/2014 | Carrico et al. |
| 2014/0121005 | A1 | 5/2014 | Nelson et al. |
| 2014/0200065 | A1 | 7/2014 | Anderson |
| 2014/0221099 | A1 | 8/2014 | Johnson |
| 2014/0248941 | A1 | 9/2014 | Nelson et al. |
| 2014/0274306 | A1 | 9/2014 | Crawford, III |
| 2014/0323206 | A1 | 10/2014 | Gagner et al. |
| 2014/0357353 | A1 | 12/2014 | Popovich |
| 2015/0012305 | A1 | 1/2015 | Truskovsky |
| 2015/0065231 | A1 | 3/2015 | Anderson et al. |
| 2015/0087408 | A1 | 3/2015 | Siemasko et al. |
| 2015/0170473 | A1 | 6/2015 | Hematji et al. |
| 2015/0178757 | A1 | 6/2015 | Moshal |
| 2015/0187158 | A1 | 7/2015 | Johnson et al. |
| 2015/0319613 | A1 | 11/2015 | Shmilov |
| 2016/0071373 | A1 | 3/2016 | Anderson et al. |
| 2016/0093166 | A1 | 3/2016 | Panambur et al. |
| 2017/0092054 | A1 | 3/2017 | Peterson et al. |

FOREIGN PATENT DOCUMENTS

| | | |
|---|---|---|
| JP | 2001-243376 | 9/2001 |
| JP | 2002-123619 | 4/2002 |
| JP | 2007-082934 | 4/2007 |
| JP | 2007-141055 | 6/2007 |
| JP | 2007-328388 | 12/2007 |
| JP | 2008-027117 | 7/2008 |
| JP | 2008-171203 | 7/2008 |
| JP | 2008-228848 | 10/2008 |
| JP | 2008-287446 | 11/2008 |
| JP | 2009-015829 | 1/2009 |
| JP | 2009-048376 | 3/2009 |
| JP | 2009-258799 | 11/2009 |
| JP | 2010-009161 | 1/2010 |
| WO | WO 2007/142980 | 12/2007 |
| WO | WO 2009/026320 | 2/2009 |
| WO | WO 2012/112602 | 8/2012 |

OTHER PUBLICATIONS

EZ Pay® Ticketing Advertisement, written by IGT, published in 2013 (1 page).

IGT Advantage® sb NexGen® II Advertisement, written by IGT, published in 2010 (2 pages).

"JCM Global, Techfirm Inc. and NRT Technology Corp. to Present First Fully Integrated NFC-Based Interactive Mobile Wager Network That Connects Player, Mobile Wager Wallet, QuickJack™ ATM and Gaming Device" online article published Oct. 1, 2012, retrieved from http://finance.yahoo.com/news/jcm-global-techfirm-inc-nrt-150000276.html (5 pages).

* cited by examiner

SYSTEM AND METHOD FOR UTILIZING VIRTUAL TICKET VOUCHERS

PRIORITY CLAIM

This application is a continuation of, claims the benefit of and priority to U.S. patent application Ser. No. 17/195,195, filed on Mar. 8, 2021, which is a continuation of, claims the benefit of and priority to U.S. patent application Ser. No. 15/850,605, filed on Dec. 21, 2017, the entire contents of which are each incorporated by reference herein.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and on the amount of the wager. Generally, symbols or symbol combinations which are less likely to occur provide higher awards.

SUMMARY

In certain embodiments, the present disclosure relates to a system including a gaming establishment component processor, and a gaming establishment component memory device which stores a plurality of instructions. When executed by the gaming establishment component processor, the instructions cause the gaming establishment component processor to receive first data associated with: a virtual ticket voucher accessible via a mobile device application of a mobile device, the virtual ticket voucher associated with a value, and an identification of a player associated with the virtual ticket voucher. When executed by the gaming establishment component processor, the instructions cause the gaming establishment component processor to, separate from the mobile device and the mobile device application, store the first data, and upon an occurrence of a mobile device failure event and a stored virtual ticket voucher retrieval event, communicate the first data associated with the virtual ticket voucher to a ticket redemption device.

In certain embodiments, the present disclosure relates to a system including A system comprising a gaming establishment component processor, and a gaming establishment component memory device which stores a plurality of instructions. When executed by the gaming establishment component processor responsive to an occurrence of a virtual ticket voucher transfer event occurring in association of a first mobile device application of a first mobile device, the instructions cause the gaming establishment component processor to communicate first data associated with a virtual ticket voucher electronically transferred from the first mobile device to a second mobile device, wherein the virtual ticket voucher is associated with a value and the second mobile device is different from the first mobile device. When executed by the gaming establishment component processor thereafter, the instructions cause the gaming establishment component processor to enable a user associated with the second mobile device to make an input, via the second mobile device, to cause a balance of a gaming establishment device to be modified based on the value associated with the virtual ticket voucher.

Additional features and advantages are described herein, and will be apparent from the following Detailed Description and the figures.

DETAILED DESCRIPTION

Figure 1A:
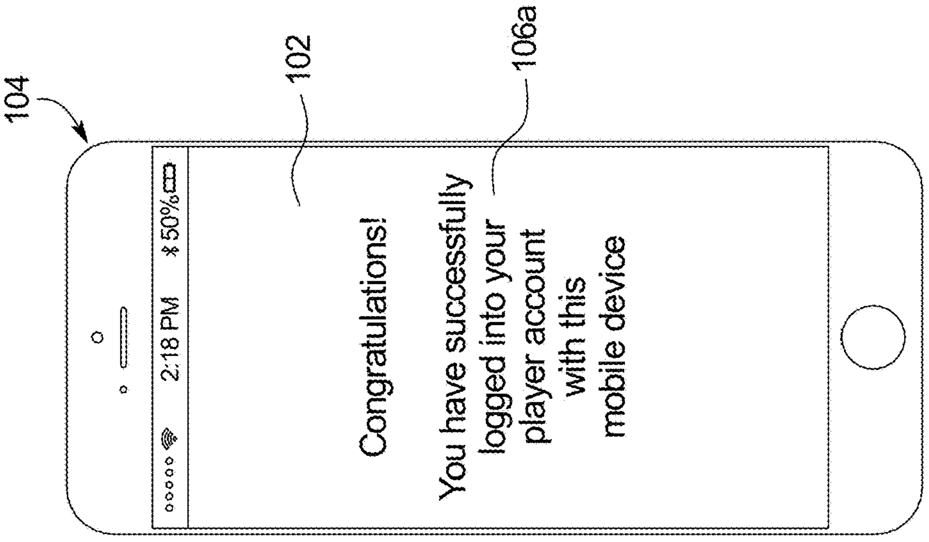
FIGS. 1A, 1B, and 1C are example graphical user interfaces displayed on a mobile device in connection with the backing up of one or more virtual ticket vouchers.

In various embodiments, the system disclosed herein utilizes virtual ticket vouchers in association with one or more transactions involving one or more components of a gaming establishment ecosystem. In these embodiments, in addition to or as an alternative from utilizing physical forms of currency or physical ticket vouchers associated with any forms of currency, the system enables a player to utilize an application running on a mobile device to transfer data associated with one or more virtual ticket vouchers maintained by a gaming establishment system, such as a ticketing system, to one or more different devices.

In certain of such embodiments, the system enables a player to utilize an application running on a mobile device to transfer data associated with one or more virtual ticket vouchers maintained by a gaming establishment system, such as a ticketing system, to a backup server. In these embodiments, to memorialize the virtual ticket voucher being associated with the player, the system enables a player to utilize an application running on a mobile device to associate or otherwise link one or more virtual ticket vouchers stored on the mobile device with the player independent of the mobile device. In these embodiments, such an association or linkage of the virtual ticket vouchers with the player provides that the associated virtual ticket vouchers may be subsequently accessed via the player independent of the mobile device, such as if the mobile device malfunctions while storing the player's virtual ticket vouchers. Such a configuration increases the mobility of the virtual ticket vouchers by providing a player an additional avenue to access the virtual ticket voucher in the event the mobile device which stores the virtual ticket vouchers fails or is otherwise lost or stolen.

In certain of such embodiments, the system additionally or alternatively enables a player to utilize an application running on a mobile device to transfer data associated with one or more virtual ticket vouchers maintained by a gaming establishment system, such as a ticketing system, to another mobile device. In these embodiments, to gift or otherwise transfer the association of such virtual ticket vouchers from one player associated with one mobile device to another player associated with another mobile device, the system enables a player to utilize an application running on a mobile device to convey one or more virtual ticket vouchers to another player without utilizing any physical forms of currency or physical ticket vouchers associated with any forms of currency. Such a configuration reduces the amount of cash and/or ticket vouchers which a first user or player may carry to be distributed to a second user or player and thus diminishes the risks that such cash and/or ticket vouchers may be lost or stolen (which is associated with various costs to the player and the gaming establishment) prior to the transfer of funds in the form of virtual ticket vouchers.

In certain of such embodiments, the system additionally or alternatively enables a player to utilize an application running on a mobile device to transfer data associated with one or more virtual ticket vouchers maintained by a gaming establishment system, such as a ticketing system, to an electronic gaming machine ("EGM") (i.e., to establish a credit balance for game play on the EGM) and/or to another gaming establishment device (i.e., to place a wager on a sporting event).

In certain of such embodiments, the system additionally or alternatively enables a player to utilize the application running on the mobile device to transfer data associated with one or more virtual ticket vouchers maintained by a gaming establishment system, such as a ticketing system, to a component of a gaming establishment retail system, such as a point-of-sale terminal associated with a gaming establishment, to fund the purchase of goods and/or services with the funds of such virtual ticket vouchers. In these embodiments, the system enables a player associated with an amount of virtual ticket vouchers to utilize a mobile device running an application, an EGM, a kiosk and/or a gaming establishment interface to convert the virtual ticket vouchers to an amount of usable or otherwise accessible funds. Detailed examples of virtual ticket vouchers and wireless communication protocols associated with such virtual ticket vouchers are described in: (i) U.S. Published Patent Application No. 2013/0023339, entitled "METHODS AND APPARATUS FOR PROVIDING SECURE LOGON TO A GAMING MACHINE USING A MOBILE DEVICE"; (ii) U.S. Published Patent Application No. 2014/0162768, entitled "METHODS AND APPARATUS FOR PROVIDING SECURE LOGON TO A GAMING MACHINE USING A MOBILE DEVICE"; (iii) U.S. Pat. No. 8,956,222, entitled "MOBILE DEVICE INTERFACES AT AN ELECTRONIC GAMING MACHINE"; (iv) U.S. Published Patent Application No. 2013/0260889, entitled "EMAILING OR TEXTING AS COMMUNICATION BETWEEN MOBILE DEVICE AND EGM"; (v) U.S. Published Patent Application No. 2013/0065668, entitled "REDEMPTION OF VIRTUAL TICKETS USING A PORTABLE ELECTRONIC DEVICE"; (vi) U.S. Patent No. 2014/0121005, entitled "VIRTUAL TICKET-IN AND TICKET-OUT ON A GAMING MACHINE"; (vii) U.S. Published Patent Application No. 2013/0065678, entitled "RETROFIT DEVICES FOR PROVIDING VIRTUAL TICKET-IN AND TICKET-OUT ON A GAMING MACHINE"; (viii) U.S. Published Patent Application No. 2013/0065686, entitled "BILL ACCEPTORS AND PRINTERS FOR PROVIDING VIRTUAL TICKET-IN AND TICKET-OUT ON A GAMING MACHINE"; (ix) U.S. Pat. No. 8,961,306, entitled "FEEDBACK TO PLAYER OF DEVICE CONNECTION STATE"; (x) U.S. Pat. No. 8,613,668, entitled "DIRECTIONAL WIRELESS COMMUNICATION"; (xi) U.S. Published Patent Application No. 2013/0316808, entitled "METHOD AND APPARATUS FOR ENTERING SENSITIVE DATA FOR AN ELECTRONIC GAMING MACHINE FROM A PORTABLE ELECTRONIC DEVICE"; (xii) U.S. Pat. No. 8,622,836, entitled "USE OF WIRELESS SIGNAL STRENGTH TO DETERMINE CONNECTION"; and (xiii) U.S. Published Patent Application No. 2014/0248941, entitled "TRANSFER VERIFICATION OF MOBILE PAYMENTS".

It should be appreciated that in certain of the embodiments disclosed herein which utilize virtual ticket vouchers accessible via a mobile device application, the virtual ticket vouchers are stored by the mobile device in association with the mobile device application. In other embodiments which utilize virtual ticket vouchers accessible via a mobile device application, the virtual ticket vouchers are stored by one or more servers, such as a gaming establishment ticketing server, but viewable via the mobile device application. Accordingly, in each of these embodiments, the mobile device stores, in association with the mobile device application, data associated with the virtual ticket vouchers to replace the use of and certain downsides or disadvantages associated with paper ticket vouchers. As such, the utilization of virtual ticket vouchers which are accessible from one or more mobile devices utilizing an application running on the mobile device (and without utilizing any physical forms of currency or physical ticket vouchers associated with any forms of currency) expands the cashless/ticketless ecosystem and thus overcomes various security concerns and labor cost concerns associated with both cash-based gaming, ticket voucher-based gaming and cash-based retail. For example, such a configuration reduces the use of paper ticket vouchers (and any ink associated with the production of such paper ticket vouchers) to reduce the amount of waste produced by gaming establishments. Such a reduction in the amount of waste produced by gaming establishments provides an additional environmental benefit of implementing the system disclosed herein.

Virtual Ticket Backup and Subsequent Redemption

In various embodiments, the system disclosed herein enables a player to backup one or more virtual ticket vouchers to one or more backup servers in the event that the mobile device which stores data associated with such virtual ticket vouchers becomes incapacitated or otherwise unavailable to the player. That is, while using a mobile device to store a virtual ticket voucher identifier and an amount of funds associated with the virtual ticket voucher (i.e., a bearer instrument redeemable for cash, game play on a gaming establishment device, and/or to fund certain transactions associated with a gaming establishment) provides an increased sense of security for certain players (i.e., players whom view it more likely to lose or misplace physical ticket vouchers (i.e., a bearer instrument redeemable for cash or game play on the EGM)) than to lose or misplace a mobile device which stores such virtual ticket vouchers and/or players whom value the additional security measure of requiring a personal identification number to be entered into the mobile device application before such virtual ticket vouchers may be redeemed), the system disclosed herein provides an additional level of security associated with the virtual ticket vouchers stored by the mobile device.

In certain embodiments, one or more mobile device applications are utilized to facilitate a backing up of one or more virtual ticket vouchers associated with a mobile device. In certain embodiments, the mobile device application utilized is downloaded to the mobile device from an application store. In certain embodiments, the mobile device application utilized is downloaded to the mobile device from one or more websites affiliated with the gaming establishment (which are accessible directly by the player and/or by a link opened when the player scans a QR code, such as a QR code associated with an EGM).

In certain embodiments, the mobile device application utilized to backup virtual ticket vouchers to a backup server may be accessed whenever the mobile device is in communication with the backup server. In certain embodiments, the mobile device application utilized to backup virtual ticket vouchers to a backup server is a location based digital wallet enabled application, such as a Passbook-enabled or Wallet-enabled application, which is accessible when the player enters a gaming establishment.

In various embodiments, following the downloading of the mobile device application to the mobile device, the mobile device application enables a user or player to register the mobile device with a gaming establishment system, such as a ticketing system, which maintains or is otherwise associated with virtual ticket vouchers. In certain embodiments, this registration includes the user or player providing certain identifying information, such as name, address, birthday, social security number, driver's license number, and/or state issued identification number, which may be necessary to be provided to later retrieve one or more virtual ticket vouchers. In certain embodiments, this registration includes enabling the user or player to create (or otherwise log into) a gaming establishment account to be associated with the virtual ticket vouchers.

In certain embodiments, the system enables the user or player to electronically enroll or otherwise sign up for a gaming establishment account via the mobile application running on the mobile device, a point-of-sale terminal of a gaming establishment retail system, an EGM and/or a kiosk. In these embodiments, as part of electronically enrolling or otherwise signing up for the gaming establishment account, the user or player provides certain identifying information, such as name, address, birthday, social security number, driver's license number, and/or state issued identification number, which may be necessary to be provided to later retrieve one or more virtual ticket vouchers.

In certain embodiments, the system enables a user or player to enroll or otherwise sign up for a gaming establishment account by adding another account, such as a gaming establishment account, to their existing player tracking account. For example, upon the player logging into a gaming session utilizing a magnetic striped card associated with a player tracking account, the system prompts the player to cause the mobile device to engage a designated portion of the EGM or a component of a gaming establishment management system (e.g., a NexGen® player tracking component of an IGT Advantage® system) supported by the EGM cabinet (i.e., a component of the EGM). It should be appreciated that any reference herein to a player tapping the mobile device to a designated portion of the EGM (or a component of the EGM such as a component of a gaming establishment management system supported by the EGM cabinet) may or may not include the player pressing a fingerprint scanner (if the mobile device is equipped with such a fingerprint scanner) while concurrently engaging the EGM (or a component of the EGM).

In certain embodiments, following the player causing the mobile device to engage the EGM (e.g., the player taps the mobile device to a player tracking card reader or other designated location(s) of the EGM), the EGM or a component of a gaming establishment management system associated with the EGM communicates, via a wireless communication protocol, identifying information associated with the player tracking account to the mobile device. The mobile device application then utilizes this identifying information associated with the player tracking account to associate the mobile device application with the player and one or more accounts associated with the player. As such, the system disclosed herein is operable to automatically configure one or more gaming establishment accounts for use in association with a mobile device application via the use of one or more physical instruments, such as player tracking magnetic striped cards, associated with such gaming establishment accounts (or different gaming establishment accounts).

Following the downloading of the mobile device application to the mobile device, the registration of the mobile device with the gaming establishment system which maintains virtual ticket vouchers and the launching of the mobile device application, the mobile device application determines zero, one or more virtual ticket vouchers associated with the mobile device.

In certain embodiments, the mobile device application displays to the player images representing any of such virtual ticket vouchers associated with the mobile device. The mobile device application enables the player to select one or more images representing one or more virtual ticket vouchers associated with the mobile device (i.e., one or more inputs made at the mobile device) to select which virtual ticket vouchers to backup.

In certain embodiments, the mobile device application automatically selects one or more virtual ticket vouchers to backup. In one such embodiment, the mobile device application automatically selects all of the virtual ticket vouchers to backup. In another such embodiment, the mobile device application selects all virtual ticket vouchers having a value above a threshold value to backup. In these embodiments, such an automatic backup occurs without the player having to prompt the mobile device application to initiate such a backup. It should be further appreciated that, in certain embodiments, the mobile device application enables the player to enable or disable such an automatic virtual ticket voucher backup feature.

In certain embodiments, the backing up of such virtual ticket vouchers occurs via the mobile device communicating data or information to a backup server regarding the virtual ticket vouchers to be backed up. In these embodiments, the mobile device application communicates such data to the backup server over one or more other wireless communication protocols including, but not limited to: one or more cellular communication standards (e.g., 3G, 4G, LTE), or one or more Wi-Fi compatible standards.

In certain embodiments, for each virtual ticket voucher to be backed up, the mobile device application communicates to the backup server virtual ticket voucher identification information. In certain embodiments, the virtual ticket voucher identification information transmitted to the backup server includes, for each virtual ticket voucher, one or more of: a date of the virtual ticket voucher issuance, a validation number associated with the virtual ticket voucher, a property address associated with the virtual ticket voucher issuance, an amount of funds associated with the virtual ticket voucher, an expiration date associated with the virtual ticket voucher, an identification number, such as a ticket number, associated with the virtual ticket voucher, an EGM identification associated with the issuance of the virtual ticket voucher, a kiosk identification association with the issuance of the virtual ticket voucher, font or formatting information associated with the virtual ticket voucher, and/or an image of each ticket voucher which is a virtual representation of that ticket voucher (e.g., an image of a front of the ticket voucher and/or an image of a back of a ticket voucher).

In these embodiments, for each virtual ticket voucher to be backed up, the mobile device application additionally communicates to the backup server player or user identification information, such as name, address, birthday, social security number, driver's license number, and/or state issued identification number. In certain other embodiments, this player or user identification information is stored in one or more other servers, such as a player tracking server, wherein the mobile device application communicates data to the backup server regarding where this player or user identification information is stored and can be accessed from.

Upon receipt of the virtual ticket voucher identification information and the player or user identification information, the backup server stores, for each virtual ticket voucher, such virtual ticket voucher identification information and the player or user identification information. In certain embodiments, the backup server is part or otherwise associated with the gaming establishment system, such as a ticketing system, which maintains virtual ticket vouchers. In one such embodiment, the backup server stores such virtual ticket voucher identification information and the player or user identification information in one or more databases in association with the virtual ticket voucher information otherwise stored to maintain such virtual ticket virtual vouchers. In another such embodiment, the backup server stores such virtual ticket voucher identification information and the player or user identification information in one or more databases independent of the one or more databases that include the virtual ticket voucher information which maintain such virtual ticket virtual vouchers. In certain embodiments, the backup server is part of or otherwise associated with a third-party.

Figure 1B:
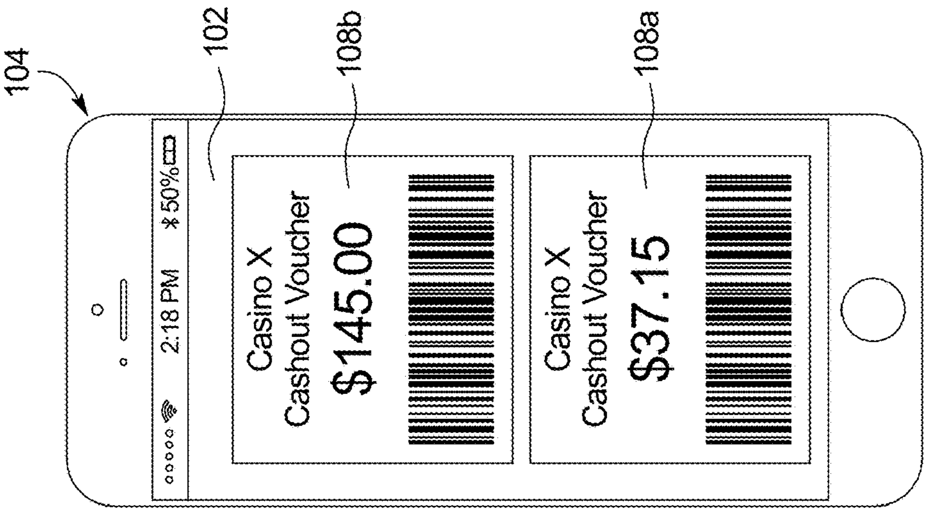
Figure 1C:
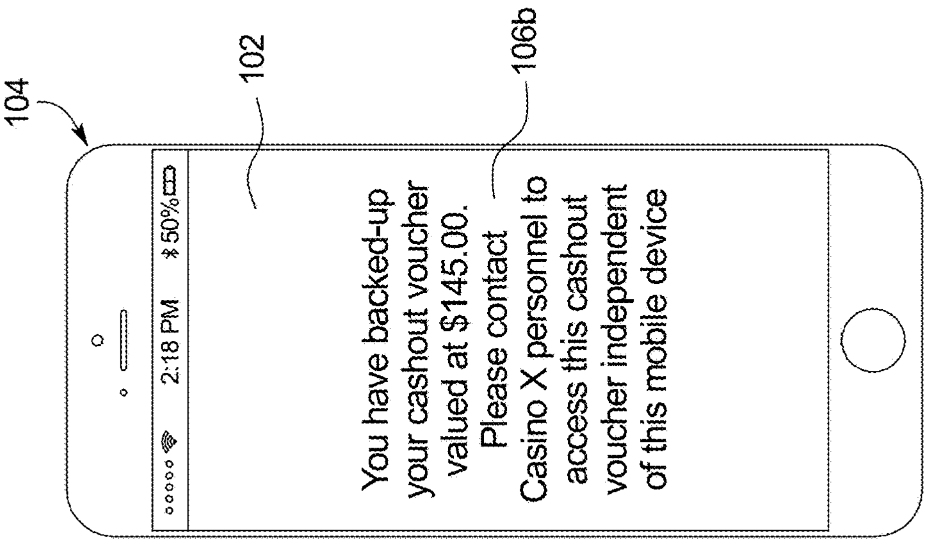

For example, as seen in FIG. 1A, following a player entering a correct personal identification number (i.e., an optional additional level of security), the mobile device application 102 of the mobile device 104 proceeds with displaying a confirmation message that the player is logged into a player account 106*a*. In this example, as seen in FIG. 1B, the mobile device application 102 of the mobile device 104 displays a listing of available virtual ticket vouchers 108*a* and 108*b* and enables the player to select which of the virtual ticket vouchers, if any, to backup. In this example, following the selection of one or more virtual ticket vouchers, the mobile device application communicates the virtual ticket voucher identifying information of the selected virtual ticket vouchers and the player or user identifying information (which is obtained in association with the logged in player account) to the backup server. As seen in FIG. 1C, following the player's selection of a virtual ticket voucher having a value of $145.00, the mobile device application 102 of the mobile device 104 displays a confirmation message to the player 106*b* regarding the virtual ticket vouchers currently associated with the player being backed up.

In certain embodiments, the backing up of such virtual ticket vouchers occurs via a gaming establishment device, such as an EGM, kiosk or a gaming establishment interface. In these embodiments, following a determination of which virtual ticket vouchers are to be backed up, the gaming establishment device, such as an EGM, kiosk or a gaming establishment interface, communicates virtual ticket voucher identification information and player or user identification information to the backup server. In different embodiments, the virtual ticket voucher identification information and player or user identification information are communicated to the backup server via any suitable wired communication protocol disclosed herein and/or any suitable wireless communication protocol disclosed herein.

In certain embodiments in which the backing up of virtual ticket vouchers utilizes a gaming establishment device, the backing up occurs after such virtual ticket vouchers are stored in association with the mobile device application. In these embodiments, the mobile device application prompts the player to cause the mobile device to engage the gaming establishment device to pair or link the mobile device with the gaming establishment device. The mobile device application then communicates to the gaming establishment device, for each virtual ticket voucher to be backed up and via a wireless communication protocol, the virtual ticket voucher identification information and the player or user identification information, wherein the gaming establishment device communicates this information to the backup server. A further explanation regarding pairing a mobile device with a gaming establishment device, such as an EGM, kiosk or gaming establishment interface and communication protocols between a mobile device and a gaming establishment device, such as an EGM, kiosk or gaming establishment interface can be found in U.S. Published Patent Application No. 2017/0092054 entitled: "GAMING SYSTEM AND METHOD FOR UTILIZING A MOBILE DEVICE TO FUND A GAMING SESSION".

In certain embodiments in which the backing up of virtual ticket vouchers utilizes a gaming establishment device, the backing up occurs prior to such virtual ticket vouchers being stored in association with the mobile device application. For example, upon a player cashing out a credit balance of an EGM and the system determining to provide the amount of the credit balance to the player via one or more virtual ticket vouchers, the system enables the player to backup such virtual ticket vouchers as part of the transfer of such virtual ticket vouchers to the mobile device. In these embodiments, following a determination of which virtual ticket vouchers are to be backed up, the gaming establishment device determines player or user identification information. Such player or user identification information may be inputted by the player at the gaming establishment device and/or obtained from one or more system components, such as a player tracking system. The gaming establishment device proceeds to communicate the player or user identification information as well as the above-described virtual ticket voucher identification information to the backup server.

In various embodiments, if the user or player loses their mobile device. obtains a new mobile device, or the mobile device becomes otherwise inoperable such as being broken or discharged (i.e., an occurrence of a mobile device failure event), the system disclosed herein enables the user or player to provide the player or user identification information to gaming establishment personnel. In this embodiment, the gaming establishment personnel can then look-up the virtual ticket voucher identifiers associated with the player or user and scan the barcodes from the computer monitor using a handheld scanner or directly import them into a ticket voucher redemption system (i.e., a stored virtual ticket voucher retrieval event). Upon the ticket voucher redemption system verifying that the virtual ticker voucher identifier(s) are valid and unredeemed, the system enables the gaming establishment personnel to redeem the vouchers manually. In this embodiment, following the manual redemption, data or information associated with such redeemed virtual ticket voucher identifiers is communicated to the backup server which then proceeds to remove the virtual ticket voucher identification information and the player or user identification information associated with the redeemed virtual ticket vouchers.

In various embodiments, if the user or player loses their mobile device, obtains a new mobile device, or the mobile device becomes otherwise inoperable such as being broken or discharged (i.e., an occurrence of a mobile device failure event), the system disclosed herein enables the user or player to provide the player or user identification information to a gaming establishment device, such as an EGM, kiosk or gaming establishment interface. In this embodiment, following the gaming establishment device verifying the identification of the player, such as via providing a personal identification number or a biometric identifier, the gaming establishment device communicates with the backup server to look-up the virtual ticket voucher identifiers associated with the player or user (i.e., a stored virtual ticket voucher retrieval event). In certain embodiments, upon a verification that the virtual ticker voucher identifier(s) are valid and unredeemed, the system enables the gaming establishment device to redeem the vouchers. In these embodiments, following the redemption, data or information associated with such redeemed virtual ticket voucher identifiers is communicated to the backup server which then proceeds to remove the virtual ticket voucher identification information and the player or user identification information associated with the redeemed virtual ticket vouchers. In certain other embodiments, upon a verification that the virtual ticker voucher identifier(s) are valid and unredeemed, the system reissues the unredeemed virtual ticket vouchers and communicates data associated with reissued virtual ticket vouchers to another device associated with the player or user. In certain other embodiments, upon a verification that the virtual ticker voucher identifier(s) are valid and unredeemed, the system cancels the unredeemed virtual ticket vouchers and communicates data associated with new virtual ticket vouchers to another device associated with the player or user. In these embodiments, following the cancellation, data or information associated with such cancelled virtual ticket voucher identifiers and such newly issued virtual ticket voucher identifiers is communicated to the backup server which updates one or more databases accordingly.

Such a configuration of associating or otherwise linking one or more virtual ticket vouchers with a player for subsequent access independent of the mobile device increases the mobility of the virtual ticket vouchers by providing a player an additional avenue to access the virtual ticket voucher in the event the mobile device which stores the virtual ticket vouchers fails, is lost or stolen or if the player obtains a new mobile device.

Player-to-Player Virtual Ticket Transfers

In various embodiments, the system enables a player to utilize an application running on a mobile device to transfer data associated with one or more virtual ticket vouchers maintained by a gaming establishment system, such as a ticketing system, to another mobile device to gift or otherwise transfer the association of such virtual ticket vouchers from one player associated with one mobile device (i.e., the gifting player) to another player associated with another mobile device (i.e., the receiving player). In these embodiments, the system enables a player to utilize an application running on a mobile device to convey one or more virtual ticket vouchers to another player without utilizing any physical forms of currency or physical ticket vouchers associated with any forms of currency. Such a configuration reduces the amount of cash and/or ticket vouchers which a first user or player may carry to be distributed to a second user or player and thus diminishes the risks that such cash and/or ticket vouchers may be lost or stolen (which is associated with various costs to the player and the gaming establishment) prior to the transfer of funds in the form of virtual ticket vouchers.

Figure 2A:
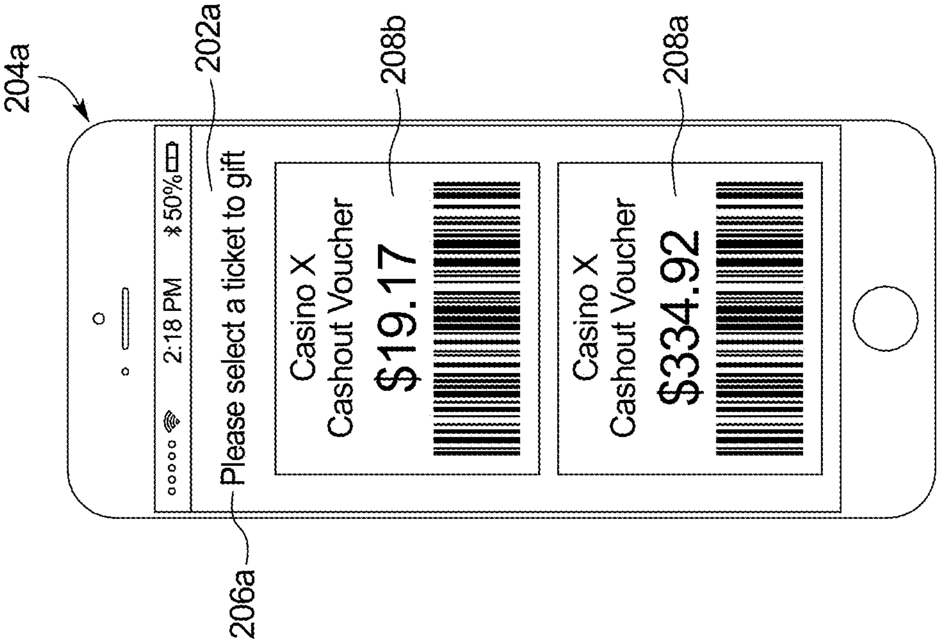
FIGS. 2A, 2B, 2C, and 2D are example graphical user interfaces displayed on a mobile device in connection with transferring one or more virtual ticket vouchers from one mobile device to another mobile device.

In certain embodiments, following launching of a mobile device application, the mobile device application determines zero, one or more virtual ticket vouchers associated with the mobile device. In certain embodiments, the mobile device application displays to the player images representing any of such virtual ticket vouchers associated with the mobile device. The mobile device application enables the player to select one or more images representing one or more virtual ticket vouchers associated with the mobile device (i.e., one or more inputs made at the mobile device) to select which virtual ticket vouchers to transfer. For example, as seen in FIG. 2A, a first mobile device application 202*a* of a first mobile device 204*a* displays a listing of available virtual ticket vouchers 208*a* and 208*b* which a first player may transfer and displays a message 206*a* prompting the player to select which virtual ticket vouchers, if any, to gift to another player.

In certain embodiments, the transfer of such virtual ticket vouchers occurs via the mobile device communicating data or information to another mobile device regarding the virtual ticket vouchers to be transferred. In these embodiments, for each virtual ticket voucher to be transferred, the mobile device application of the mobile device of the gifting player communicates to the mobile device of the receiving player virtual ticket voucher identification information. In these embodiments, the mobile device application of one mobile device communicates the virtual ticket voucher identifying information to the other mobile device over one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and one or more short range communication protocols (e.g., a near field communication ("NFC") protocol).

In certain embodiments, the transfer of such virtual ticket vouchers occurs via one mobile device application displaying data or information regarding the virtual ticket vouchers to be transferred which is captured by another mobile device. In these embodiments, for each virtual ticket voucher to be transferred, the mobile device application of the mobile device of the gifting player displays an indicator, such as a barcode seen in FIG. 2A or a QR code, which is scanned or otherwise captured by the mobile device of the receiving player to transfer the virtual ticket voucher from being associated with one mobile device to being associated with another mobile device.

In certain embodiments, data associated with one or more transferred virtual ticket vouches occurs by the gifting player using the mobile device application to send a message, such as an email or text message, to the receiving player. The message includes a hyperlink and/or an attachment associated with the virtual ticket vouchers to be transferred. When the receiving player accesses the hyperlink and/or attachment via the receiving player's mobile device, the receiving player's mobile device activates or launches the mobile device application and the one or more virtual ticket vouchers are transferred to the mobile device application of the mobile device of the receiving player.

In certain embodiments, the transfer of such virtual ticket vouchers occurs via a gaming establishment device, such as an EGM, kiosk or a gaming establishment interface. In these embodiments, following one or more inputs by the gifting player at the gaming establishment device regarding which virtual ticket vouchers are to be transferred, the gaming establishment device communicates virtual ticket voucher identification information to the mobile device of the receiving player.

In certain embodiments in which the transfer of virtual ticket vouchers utilizes a gaming establishment device, the transfer occurs after such virtual ticket vouchers are stored in association with the mobile device application. In these embodiments, the mobile device application prompts the player to cause the mobile device to engage the gaming establishment device to pair or link the mobile device with the gaming establishment device. The mobile device application then communicates to the gaming establishment device, for each virtual ticket voucher to be transferred and via a wireless communication protocol, the virtual ticket voucher identification information, wherein the gaming establishment device communicates this information to the mobile device of the receiving player.

In certain embodiments in which the transfer of virtual ticket vouchers utilizes a gaming establishment device, the transfer occurs prior to such virtual ticket vouchers being stored in association with the mobile device application. For example, upon a player cashing out a credit balance of an EGM and the system determining to provide the amount of the credit balance to the player via one or more virtual ticket vouchers, the system enables the player to transfer such virtual ticket vouchers. In these embodiments, following a determination of which virtual ticket vouchers are to be transferred, the gaming establishment device proceeds to communicate the virtual ticket voucher identification information to the mobile device of the receiving player.

It should be appreciated that in these embodiments, the virtual ticket voucher identification information conveyed from one device to another device includes, for each virtual ticket voucher, one or more of: a date of the virtual ticket voucher issuance, a validation number associated with the virtual ticket voucher, a property address associated with the virtual ticket voucher issuance, an amount of funds associated with the virtual ticket voucher, an expiration date associated with the virtual ticket voucher, an identification number, such as a ticket number, associated with the virtual ticket voucher, an EGM identification associated with the issuance of the virtual ticket voucher, a kiosk identification association with the issuance of the virtual ticket voucher, font or formatting information associated with the virtual ticket voucher, and/or an image of each ticket voucher which is a virtual representation of that ticket voucher (e.g., an image of a front of the ticket voucher and/or an image of a back of a ticket voucher).

In various embodiments, following the mobile device of the receiving player receiving the virtual ticket voucher identification information, to reflect this transfer of one or more virtual tickets, the mobile device application of that mobile device updates a listing or log of which virtual ticket vouchers are associated with that mobile device application and accessible via the mobile device application. In addition to the mobile device application of the mobile device of the receiving player accounting for this transfer in of virtual ticket vouchers, to reflect this transfer of one or more virtual tickets, the mobile device application of the mobile device of the gifting player updates a listing or log of which virtual ticket vouchers are associated with that mobile device application and accessible via the mobile device application. That is, the mobile device application of the mobile device of the gifting player deletes the data associated with the transferred virtual ticket voucher such that that mobile device cannot be subsequently used in association with that virtual ticket voucher (short of the same virtual ticket voucher being transferred back to the mobile device of the gifting player).

Figure 2B:
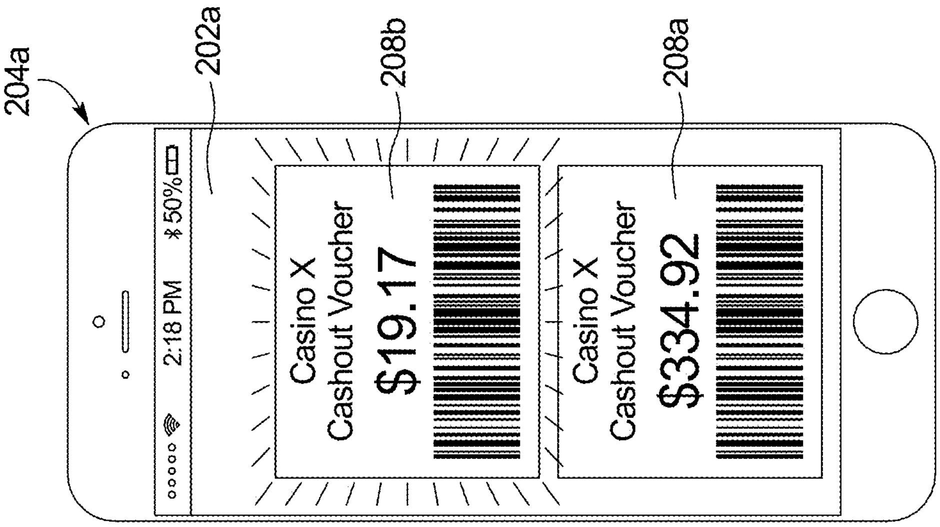
Figure 2C:
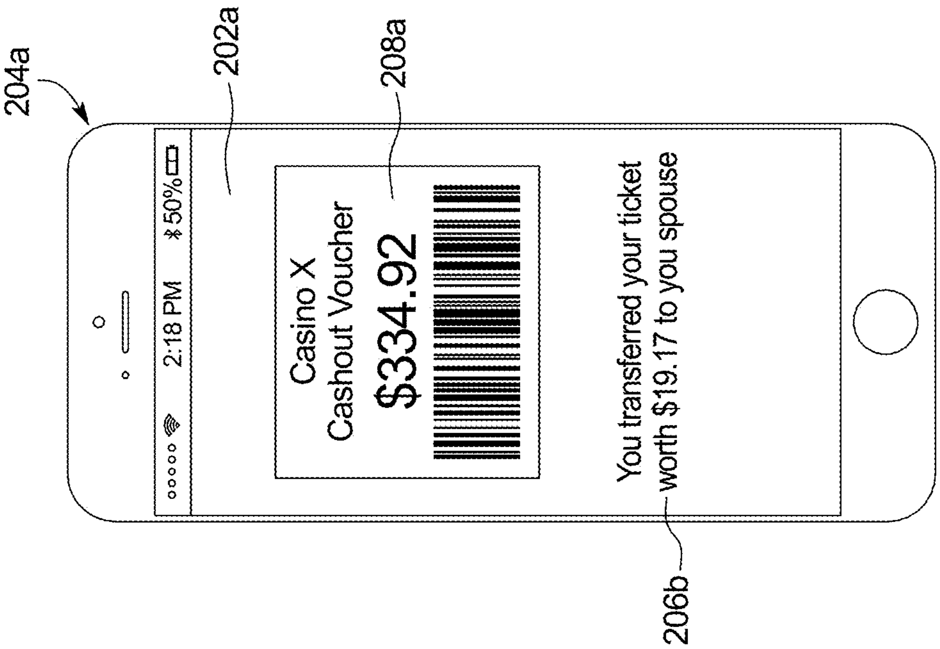
Figure 2D:
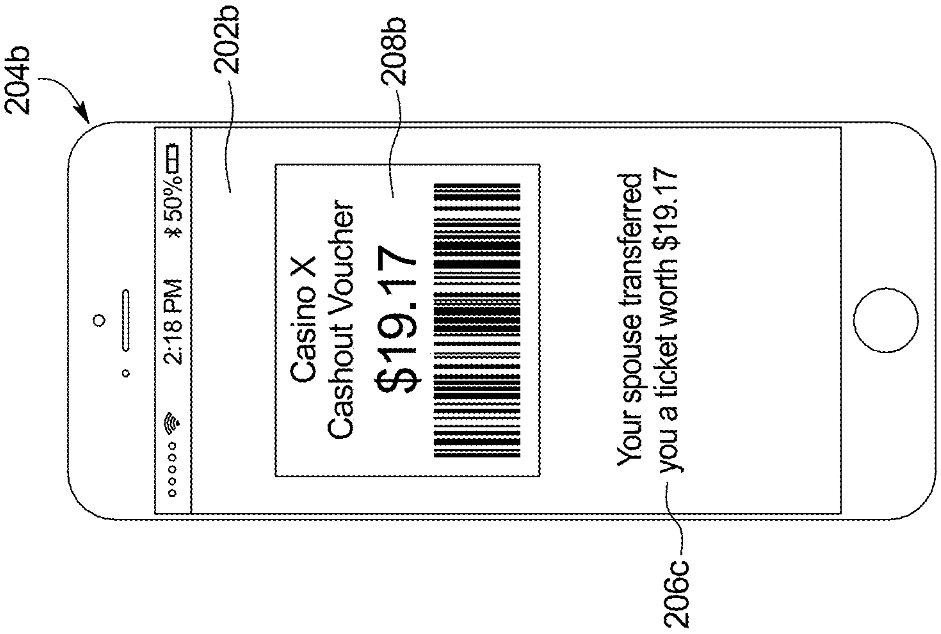

For example, as seen in FIG. 2B, following the selection of the virtual ticket voucher 208*b* by a first player to be transferred, the first mobile device application 202*a* of the first mobile device 204*a* of the first player communicates the virtual ticket voucher identifying information of the selected virtual ticket vouchers to a second mobile device of a second player. In this example, following this selection of which virtual ticket vouchers to transfer and the subsequent transfer, the first mobile device application 202*a* of the first mobile device 204*a* displays a confirmation message to the first player 206*b* regarding the virtual ticket vouchers transferred away (see FIG. 2C) and the second mobile device application 202*b* of the second mobile device 204*b* displays a confirmation message to a second player 206*c* regarding the virtual ticket vouchers transferred in (see FIG. 2D).

In certain embodiments, the transfer of one or more virtual ticket vouchers from one mobile device to another mobile device includes the transfer of virtual ticket voucher identification information without any communications to a gaming establishment system, such as a ticketing system. In these embodiments, the virtual ticket vouchers are no different than paper ticket vouchers in the sense that players are free to exchange such virtual ticket vouchers amongst each other with the gaming establishment system, such as a ticketing system, not knowing the identity of the holder of such virtual ticket vouchers.

In certain other embodiments, the transfer of one or more virtual ticket vouchers from one mobile device to another mobile device includes the transfer of virtual ticket voucher identification information includes communicating data to a gaming establishment system, such as a ticketing system. In these embodiments, the mobile device of the gifting player and/or the mobile device of the receiving player communicates, via a wireless communication protocol, data associated with the selected virtual ticket voucher to be transferred to one or more servers, such as a virtual ticket voucher server. The server then determines whether to authorize the transfer of the selected virtual ticket voucher. If the transfer of the selected virtual ticket voucher is authorized, the server: (i) updates a database of virtual ticket vouchers to reflect the transfer of the selected virtual ticket vouchers, (ii) causes a transfer of virtual ticket vouchers confirmation to be communicated to and displayed by each of the mobile devices, and (iii) causes the amount of funds associated with the transferred virtual ticket voucher(s) to be available for wagering by the receiving player.

It should be appreciated that such electronic virtual ticket voucher gifting as described herein provides a way to track the transfer of funds and combat certain money laundering activities. Specifically, certain regulations require gaming establishments to report currency exchanges for a player in excess of $10,000 for a total gaming day, which includes buy-ins and paid out money. However, one mechanism that certain money launderers try to leverage to avoid reaching a transaction reporting threshold is to spread out the transactions across multiple people. For example, one person may buy $9,000 in chips, provide the chips to a handful of friends, who then try to cash them out. Each person would then have a total cash transaction for the gaming day of less than $10,000. To combat such unscrupulous behavior, the system disclosed herein is operable to track total buy-ins or buy-out transactions by a given mobile device, using a unique identifier of the mobile device, and also by transactions of all tickets redeemed by mobile devices that a player gifted a ticket to for the gaming day. To further combat such unscrupulous behavior, the system disclosed herein is operable to track the various cash-in meters at various EGMs during cashout transaction and correlate that to the mobile device that stored the ticket and causing the EGM to report cash-in meters on virtual ticket voucher-out events which occur in association with a mobile device. Accordingly, the system disclosed herein assists law enforcement personnel in identifying potential money laundering activity occurring at gaming establishments.

Virtual Ticket Accumulation

In various embodiments, the system disclosed herein enables a player to convert a plurality of virtual ticket vouchers to a single virtual ticket voucher. In these embodiments, rather than a player being associated with a number of virtual ticket vouchers and the associated time spent redeeming each of these virtual ticket vouchers, the system enables a player to redeem such virtual ticket vouchers in exchange for a new virtual ticket voucher associated with the sum of the values of each of the redeemed virtual ticket vouchers.

In certain embodiments, following launching of a mobile device application, the mobile device application determines zero, one or more virtual ticket vouchers associated with the mobile device. In certain embodiments, the mobile device application displays to the player images representing any of such virtual ticket vouchers associated with the mobile device. The mobile device application enables the player to select a plurality of images representing a plurality of virtual ticket vouchers associated with the mobile device (i.e., one or more inputs made at the mobile device) to select which virtual ticket vouchers to convert to a single virtual ticket voucher.

In certain embodiments, the conversion of such virtual ticket vouchers occurs via the mobile device communicating data or information to a server, such as a virtual ticket voucher server, regarding the virtual ticket vouchers to be converted. In these embodiments, for each virtual ticket voucher to be converted, the mobile device application communicates to the server virtual ticket voucher identification information. In certain embodiments, the virtual ticket voucher identification information communicated to the server includes, for each virtual ticket voucher, one or more of: a date of the virtual ticket voucher issuance, a validation number associated with the virtual ticket voucher, a property address associated with the virtual ticket voucher issuance, an amount of funds associated with the virtual ticket voucher, an expiration date associated with the virtual ticket voucher, an identification number, such as a ticket number, associated with the virtual ticket voucher, an EGM identification associated with the issuance of the virtual ticket voucher, a kiosk identification association with the issuance of the virtual ticket voucher, font or formatting information associated with the virtual ticket voucher, an image of each ticket voucher which is a virtual representation of that ticket voucher (e.g., an image of a front of the ticket voucher and/or an image of a back of a ticket voucher). In these embodiments, the mobile device application communicates the virtual ticket voucher identifying information to the server over one or more other wireless communication protocols including, but not limited to: one or more cellular communication standards (e.g., 3G, 4G, LTE), or one or more Wi-Fi compatible standards.

In these embodiments, following the receipt of the virtual ticket voucher identifying information for the virtual ticket vouchers to be converted, the server determines whether to authorize the conversion of the selected virtual ticket vouchers. That is, the server determines if the virtual ticket vouchers to be converted are valid and unredeemed. If the conversion of the selected virtual ticket vouchers is authorized, the server cancels or redeems the unredeemed virtual ticket vouchers and issues a new virtual ticket voucher associated with a sum of the cancelled virtual ticket vouchers. The server then communicates data associated with the new virtual ticket voucher to the mobile device which displays one or more messages to the player or user regarding such cancelled virtual ticket vouchers and such newly issued virtual ticket voucher.

Transfer of Virtual Ticket Vouchers Between Accounts

In various embodiments, in addition to backing up zero, one or more virtual ticket vouchers and/or enabling one player to transfer or gift a virtual ticket voucher to another player, the system disclosed herein enables virtual ticket vouchers to be transferred between different electrical or virtual accounts of the system. In certain embodiments, the system includes various components or sub-systems which are each associated with or otherwise maintain one or more electronic or virtual accounts. In these embodiments, the various accounts maintained for a user or player collectively form a resort or enterprise account (i.e., a gaming establishment fund management account) for the user. That is, the collection of accounts, such as cashless wagering accounts and gaming establishment retail accounts associated with or otherwise maintained for the player or user collectively form a resort or enterprise account (i.e., an integrated resort or gaming establishment fund management wallet) which the player or user may access to transfer funds and/or view balance information amongst the various accounts associated with or otherwise maintained for the player or user.

In various embodiments, the system includes one or more cashless wagering systems which are each associated with or otherwise maintain one or more cashless wagering accounts (i.e., one or more cashless wagering accounts).

In certain embodiments, the system includes a first cashless wagering system which maintains a first cashless wagering account (i.e., a first cashless wagering account). In these embodiments, the system enables a player to utilize a mobile device application running on a mobile device to facilitate the electronic transfer of funds associated with one or more virtual ticket vouchers between this first cashless wagering account and an EGM, an electronic gaming table, a gaming terminal associated with one or more gaming tables, a kiosk or any suitable gaming establishment device disclosed herein.

In certain embodiments, the system additionally or alternatively includes a second cashless wagering system which maintains a second cashless wagering account (i.e., a second cashless wagering account) associated with a physical instrument, such as a player issued magnetic striped card. In these embodiments, the system enables a player to utilize the physical instrument (e.g., via inserting the card into a player tracking unit associated with a gaming establishment device) to facilitate the electronic transfer of funds associated with one or more virtual ticket vouchers between this second cashless wagering account and an EGM, an electronic gaming table, a gaming terminal associated with one or more gaming tables, a kiosk or any suitable gaming establishment device disclosed herein.

In various embodiments, in addition to or an alternative of maintaining one or more cashless wagering accounts via one or more cashless wagering systems, the system includes one or more gaming establishment retail systems which each maintain one or more gaming establishment retail accounts (i.e., gaming establishment retail accounts). Such a gaming establishment retail account (i.e., a gaming establishment retail wallet) of a gaming establishment retail system integrates with various retail point-of-sale systems throughout the gaming establishment to enable players to purchase goods and/or services via the player's gaming establishment retail account. In various embodiments, a gaming establishment retail account is part of a gaming establishment retail system. In these embodiments, the gaming establishment retail account is a retail account with a balance or a pre-paid access account which, per current regulations from the U.S. Treasury Department Financial Crimes Enforcement Network ("FinCEN"), cannot be convertible to cash and can only be used for the purchase of goods and/or services. That is, once an amount of funds are deposited in a gaming establishment retail account, certain regulations dictate that such funds cannot be converted back to cashable funds. Accordingly, while an amount of funds deposited in a gaming establishment retail account may be used with various retail point-of-sale systems throughout the gaming establishment to enable players/users to purchase goods and/or services, such funds deposited in the gaming establishment retail account cannot be converted to cash. Put differently, following the establishment of a gaming establishment retail account and the funding of the gaming establishment retail account with an amount of virtual ticket vouchers, the player presents a retail wallet identity (i.e., a physical card associated with the gaming establishment retail account or a mobile device running a mobile device application associated with the gaming establishment retail account) at an applicable terminal of the point-of-sale system within or otherwise associated with the gaming establishment for the purchase of goods and/or services. The point-of-sale system then communicates with the gaming establishment retail wallet system to confirm that the gaming establishment retail account has adequate funds for the intended purchase. If the gaming establishment retail wallet system confirms the presence of adequate funds in the gaming establishment retail account, the point-of-sale system authorizes the sale of the goods and/or services and communicates data to the gaming establishment retail wallet system to deduct the price of the purchased goods and/or services from the gaming establishment retail account. On the other hand, if the gaming establishment retail wallet system indicates that the gaming establishment retail account lacks adequate funds for the purchase, the point-of-sale system denies this sale transaction of the goods and/or services using the gaming establishment retail account.

In certain embodiments, the gaming establishment fund management system is additionally in communication with one or more external funding sources which maintain one or more external accounts for the player. For example, a gaming establishment fund management account is in communication with a network of one or more banks or other financial institutions which operate to electronically transfer funds from the player's accounts maintained as such banks or financial institutions to the gaming establishment fund management system. In certain embodiments, the gaming establishment fund management account is associated with one or more external accounts, such as one or more credit card accounts maintained by one or more financial institutions, one or more debit card accounts maintained by one or more banks or credit unions, one or more financial institution accounts, such as a brokerage account, maintained by one or more financial institutions and/or one or more third-party maintained accounts (e.g., one or more PayPal® accounts or Venmo® accounts). It should be appreciated that described as the gaming establishment fund management system being in communication with one or more external funding sources, in different embodiments, any component or sub-system described herein can be in communication with one or more external funding sources.

In certain embodiments (not shown), the gaming establishment fund management system (which maintains the central gaming establishment fund management account or central resort wallet for a player) is in communication with one or more credit systems which each issue the player one or more lines of credit or markers and/or one or more credit reporting/credit risk systems which monitor and report on various accounts associated with the player. It should be appreciated that while described as the gaming establishment fund management system being in communication with one or more credit systems and/or one or more credit reporting/credit risk systems, in different embodiments, any component or sub-system described herein can be in communication with one or more credit systems and/or one or more credit reporting/credit risk systems.

In various embodiments, the system enables an amount of funds associated with one or more virtual ticket vouchers to be established or otherwise deposited in a gaming establishment account, such as a gaming establishment fund management account, a cashless wagering account and/or a gaming establishment retail account. In certain embodiments, the gaming establishment account is associated with funds associated with one or more virtual ticket vouchers. In certain embodiments, the system enables a player associated with an amount of virtual ticket vouchers to utilize an EGM, a mobile device running an application, a kiosk and/or a gaming establishment interface to convert the virtual ticket vouchers to an amount deposited into a gaming establishment account.

In certain embodiments, the system disclosed herein enables a mobile device application to facilitate the use of the funds associated with one or more virtual ticket vouchers from a gaming establishment account. In various embodiments, after pairing the mobile device with a gaming establishment device, such as an EGM or a component of a gaming establishment system supported by a cabinet of a gaming establishment device, such as a component of a gaming establishment management system (e.g., a NexGen® player tracking component of an IGT Advantage® system) supported by an EGM cabinet, the mobile device application communicates one or more requested actions to be performed to the gaming establishment device.

It should be appreciated that while certain data or information pertaining to one or more of the requested actions pertaining to virtual ticket vouchers are communicated from a gaming establishment device (or a component of a gaming establishment device, such as a component of a gaming establishment management system supported by or otherwise located inside the gaming establishment device) to a mobile device, such data or information may additionally or alternatively be communicated: (i) from one or more servers to a mobile device via one or more wireless communication protocols, or (ii) from a gaming establishment device to one or more servers via one or more wireless communication protocols and then from one or more servers to a mobile device via one or more wireless communication protocols.

It should be further appreciated that any functionality or process described herein may be implemented via one or more servers, a gaming establishment device, one or more components of a gaming establishment device (such as a component of a gaming establishment management system supported by or otherwise located inside the gaming establishment device), or a mobile device application. For example, while certain data or information described herein is explained as being communicated from a gaming establishment device or a component of a gaming establishment management system supported by or otherwise located inside the gaming establishment device to a mobile device via one or more wireless communication protocols, such data or information may additionally or alternatively be communicated from one or more servers to a mobile device via one or more wireless communication protocols. Accordingly: (i) while certain functions, features or processes are described herein as being performed by a gaming establishment device, such as an EGM, such functions, features or processes may alternatively be performed by one or more servers, or one or more mobile device applications, or one or more components of a gaming establishment management system supported by or otherwise located inside the gaming establishment device), (ii) while certain functions, features or processes are described herein as being performed by one or more mobile device applications, such functions, features or processes may alternatively be performed by one or more servers, or one or more gaming establishment devices, or one or more components of a gaming establishment management system supported by or otherwise located inside the gaming establishment device, (iii) while certain functions, features or processes are described herein as being performed by one or more servers, such functions, features or processes may alternatively be performed by one or more gaming establishment devices, or one or more mobile device applications, or one or more components of a gaming establishment management system supported by or otherwise located inside the gaming establishment device, and (iv) while certain functions, features or processes are described herein as being performed by one or more components of a gaming establishment management system, such functions, features or processes may alternatively be performed by one or more gaming establishment devices, or one or more mobile device applications, or one or more servers.

While described below as various requested actions pertaining to virtual ticket vouchers being performed in association with an EGM, such requested actions may additionally or alternatively be performed in association with any suitable gaming establishment device located in a gaming establishment, such as an electronic gaming table, a gaming terminal associated with one or more gaming tables, or a kiosk which receives wagers such as wagers on sporting events and/or any suitable gaming establishment device located in a non-gaming area of a gaming establishment, such as a point-of-sale terminal located in a retail area of a gaming establishment.

In certain embodiments, the action to be performed includes enabling the player to transfer funds from a virtual ticket voucher to the EGM utilizing a mobile device application executed by a mobile device. In certain embodiments, following the launching of the mobile device application, such as following the player selecting an image associated with an electronic casino loyalty account card stored via a digital wallet application, the mobile device application determines an amount of funds to be transferred to the EGM via the redemption of a virtual ticket voucher.

In these embodiments, the mobile device application displays to the player images representing any virtual ticket vouchers associated with the mobile device. The mobile device application enables the player to select one or more images representing one or more virtual ticket vouchers associated with the mobile device (i.e., one or more inputs made at the mobile device). In these embodiments, similar to as described above with respect to the transfer of funds from a cashless wagering account to an EGM via a mobile device application, following the determination of which virtual ticket vouchers are to be transferred from the mobile device application to the EGM, the mobile device application prompts the player to cause the mobile device to engage the EGM. The mobile device application then communicates, via a wireless communication protocol, data associated with the selected virtual ticket voucher to be transferred. The EGM then communicates with one or more servers, such as a virtual ticket voucher server, to request the selected virtual ticket voucher (and more specifically the amount of funds associated with the selected virtual ticket voucher) be transferred from to the EGM. The server then determines whether to authorize the transfer of the selected virtual ticket voucher. If the transfer of the selected virtual ticket voucher is authorized: (i) the server updates a database of virtual ticket vouchers to reflect the redemption of the selected virtual ticket voucher, (ii) the EGM proceeds with updating a credit balance of the EGM to account for the amount of funds associated with the selected virtual ticket voucher, (iii) a transfer of funds confirmation is communicated to and displayed by the mobile device, and (iv) the amount of funds associated with the selected virtual ticket voucher are available for wagering by the player.

In certain other embodiments, following a full or partial depletion of a credit balance of the EGM, the EGM wirelessly communicates with the mobile device and queries the mobile device for the presence of any additional virtual ticket vouchers associated with the mobile device application. That is, when the credit balance of the EGM is empty, when the credit balance of the EGM has less than an amount of credits to repeat a previous wager, when the credit balance of the EGM has less credits than a minimum wager and/or when the credit balance of the EGM is below a designated threshold amount, the EGM communicates with the mobile device to determine if the mobile device application is associated with any additional available virtual ticket vouchers. If no additional virtual ticket vouchers are available, the EGM prompts the player to fund the credit balance of the EGM via another funding avenue as disclosed herein. On the other hand, if at least one virtual ticket voucher is available, the EGM operates with the mobile device to facilitate the transfer of such at least one virtual ticket voucher to the EGM. In one such embodiment, the mobile device application communicates a listing of available virtual ticket vouchers to the EGM. The EGM proceeds with displaying the listing of available virtual ticket vouchers and enables the player to select, at the EGM, one or more of the available virtual ticket vouchers to redeem. If the player selects one or more of the available virtual ticket vouchers, the EGM communicates the player's selection to the mobile device and the mobile device application proceeds with facilitating the transfer of such virtual ticket vouchers to the EGM as described herein. It should be appreciated that this embodiment enables a player to utilize a mobile device to facilitate the transfer funds, such as transfer of funds associated with one or more virtual ticket vouchers associated with the mobile device, without having to reengage the EGM with the mobile device.

In certain other embodiments, following a full or partial depletion of a credit balance of the EGM, the EGM wirelessly communicates with the mobile device (or communicates with one or more server which communicate with the EGM) and queries the mobile device for the presence of any additional virtual ticket vouchers associated with the mobile device application. If no additional virtual ticket vouchers are available, the EGM prompts the player to fund the credit balance of the EGM via another funding avenue as disclosed herein. On the other hand, if at least one virtual ticket voucher is available, the mobile device application proceeds with facilitating the automatic transfer of the at least one virtual ticket voucher to the EGM as described herein. It should be appreciated that this embodiment enables a player to automatically transfer funds, such as transfer of funds associated with one or more virtual ticket vouchers associated with the mobile device, via the mobile device without the player having to reengage the EGM with the mobile device and without the player having to prompt either the EGM or the mobile device application to initiate such a transfer. It should be further appreciated that, in certain embodiments, the system enables the player to enable or disable such an automatic "transfer of virtual ticket vouchers" feature.

In another embodiment, the EGM periodically communicates information to the mobile device regarding the status or amount of the credit balance of the EGM. In one such embodiment, based on this communicated information, the mobile device application determines when to alert the player to potentially transfer additional funds to the EGM utilizing the mobile device application. For example, the mobile device application could vibrate the mobile device, or create a sound, which alerts the player to view the mobile device application and select which additional funds to virtually insert into or load on the EGM. In another such embodiment, based on this communicated information, the mobile device application determines when to automatically transfer one or more additional and available virtual ticket vouchers to the EGM.

It should be appreciated that the utilization of a mobile device to transfer funds to a gaming establishment device via virtual ticket vouchers reduces the costs associated with utilizing cash, ticket vouchers and/or promotional tickets. For example, the utilization of cash and ticket vouchers is associated with the labor costs of having to periodically remove a cash box including received ticket vouchers and cash from an EGM, replace the removed cash box with an empty one and refill the blank ticket voucher stacks housed by the EGM. The utilization of such cash and ticket vouchers is further associated with the various labor costs of counting the cash and ticket vouchers removed from the EGM. Specifically, any removed cash is transported to a secure area where one or more individuals are involved in counting and recording the various sums of cash and/or ticket vouchers removed from each EGM. The cash amounts removed from each EGM are reconciled with other information sources, such as from hard meters on the EGM or records from a server that generates and validates ticket vouchers. The reconciliation process ensures the earnings from the EGM are properly taxed. The utilization of a wirelessly connected mobile device to facilitate one or more requested actions involving virtual ticket vouchers as described herein reduces or eliminates these various costs associated with utilizing cash and/or paper ticket vouchers.

Securing Transactions Between Mobile Device and EGM

While the facilitation of the transfer of funds to and from an EGM via a mobile device and using virtual ticket vouchers has many advantages described herein, as mentioned above, certain security concerns arise when transferring fund data wirelessly between an EGM and a mobile device (or between an EGM and the mobile device via one or more servers). For example, a malicious person may attempt to intercept such a wireless communication and steal the funds being transferred by stealing the virtual ticket vouchers. Such a malicious person may devise electronics, such as an antenna or other electronics placed on or near the EGM to insert their mobile device between a "cash out" input and the mobile device engaging the EGM.

More specifically, when facilitating the transfer of deposited funds and/or an amount of winnings from the EGM to a cashless wagering account via the mobile device application in the form of virtual ticket vouchers, a player initiates an engagement of the EGM with the mobile device, such as tapping the mobile device to a player tracking card reader or other designated location(s) of the EGM (or a component of the EGM). However, before the engagement of the EGM with the player's mobile device is complete, an intruder utilizes such devised electronics to beat the player to the completion of the engagement. For example, when the player subsequently actuates a "cash out" button on the EGM, the EGM (or a component of the EGM) proceeds with transferring the amount of the credit balance in the form of a virtual ticket voucher to the mobile device of the intruder. Such a concern is also present when a player attempts to wirelessly transfer funds as virtual ticket vouchers to an EGM via a mobile device wherein the intruder device intercepts such a transfer and reroutes the funds to the mobile device of the intruder.

In view of these security concerns, in certain embodiments of the present disclosure utilize a time window, such as ten seconds, in association with one or more requested actions. In one such embodiment, after receiving an initiation of an engagement of the EGM with the mobile device, the EGM (or a component of the EGM) assigns or otherwise associates a time window with such an engagement. If one mobile device is attempted to be paired with the EGM within the associated time window before an action is requested, the EGM determines that only one mobile device is communicating with the EGM and the EGM proceeds with executing the requested action, such as a requested fund transfer as described herein. On the other hand, if more than one mobile device is attempted to be paired with the EGM within the associated time window before an action is requested, the EGM determines that an intruder device may be present. In such a situation, the EGM cancels the requested action and/or prompts the player to reengage the EGM with the mobile device.

In another such embodiment, after receiving a requested action from the mobile device, the EGM assigns or otherwise associates a time window with such a requested action. Following the requested action, if one mobile device is attempted to be paired with the EGM within the associated time window, the EGM determines that only one mobile device is communicating with the EGM and the EGM proceeds with executing the requested action, such as a requested fund transfer as described herein. On the other hand, following the requested action, if more than one mobile device is attempted to be paired with the EGM within the associated time window, the EGM determines that an intruder device may be present. In such a situation, the EGM cancels the requested action and/or prompts the player to reengage the EGM with the mobile device.

It should be appreciated that in addition to thwarting an isolated attempt by an intruder to intercept a wireless fund transfer involving virtual ticket vouchers, the system is configured to identify if a device is involved in multiple attempted engagements with an EGM over a designated threshold or time window. In this embodiment, such a device may be prohibited from being involved in further wireless fund transfers. For example, if multiple engagements are detected involving a single device within a twenty-four hour period, then that mobile device could be banned from participating in any future engagements. Alternatively, that device could be prevented from participating in engagements for a designated period of time, such as a cooling-off period.

Mobile Device/EGM Communications

Figure 3:
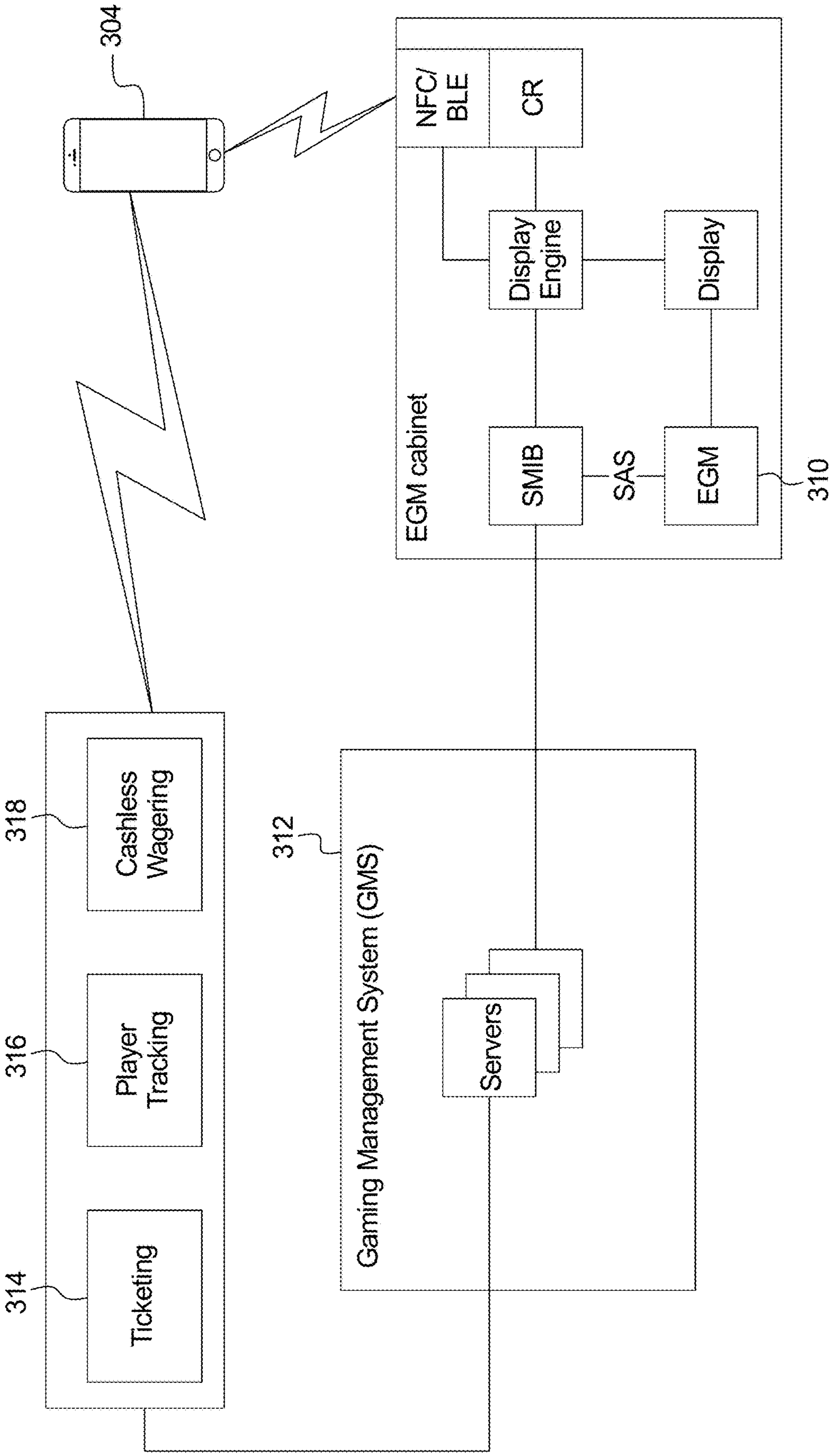
FIG. 3 is an example wireless configuration of the system of the present disclosure.

As indicated above, in various embodiments, the insertion and removal of an electronic player tracking card (i.e., the logging in and logging out of the player from the player tracking system), and/or the facilitation of the transfer of funds using virtual ticket vouchers is accomplished by one or more wireless communication protocols between the gaming establishment device and the mobile device. In such embodiments, the gaming establishment device, such as an EGM, of the present disclosure includes one or more mobile device interfaces for communicating with a mobile device utilizing one or more wireless communication protocols including, but not limited to: Bluetooth™, Bluetooth™ Low Energy ("BLE"), one or more cellular communication standards (e.g., 3G, 4G, LTE), one or more Wi-Fi compatible standards, and one or more short range communication protocols (e.g., a near field communication ("NFC") protocol). In certain embodiments, as seen in FIG. 3 and as described above, utilizing one or more wireless or wired communication protocols, a mobile device 304 communicates with an EGM 310 as well as a gaming establishment management system 312 which operates with or is otherwise in communication with one or more servers, such as one or more ticketing servers 314, patron management servers 316 and cashless wagering servers 318.

In certain embodiments, the communication with the mobile device can occur through one or more wireless interfaces of the EGM. Such wireless interfaces are configured to receive information, such as information associated with one or more accounts and instructions to initiate a transfer of funds to and from a cashless wagering account and the EGM utilizing a mobile device. In one embodiment, the wireless interface is integrated into the cabinet of the EGM and the EGM processor is configured to communicate directly with and send control commands to the wireless interface. In another embodiment, the wireless interface is integrated into a device mounted to and/or within the EGM cabinet, such as a player tracking unit or a player identification device of a player tracking unit. In certain embodiments where the wireless interface is embedded in a secondary device, such as a player tracking unit, the EGM processor sends control commands to control the wireless interface via a secondary controller, such as a player tracking controller.

In certain embodiments which utilize the NFC implementation, the mobile device application registers a mobile device application with one or more processors of the mobile device. In these embodiments, when the mobile device is detected by an NFC reader of a component of a gaming establishment management system supported by the EGM cabinet, such as a NexGen® player tracking component of an IGT Advantage® system, the component of the gaming establishment management system supported by the EGM cabinet communicates one or more data messages to the mobile device (or to one or more servers which then communicate such data messages to the mobile device). Such data messages are commands generated by the component of the gaming establishment management system supported by the EGM cabinet when the mobile device is detected in the NFC reader field. The processor of the mobile device communicates the data message to the mobile device application. The mobile device application responds, such as communicating a triggering message, and a communication channel is opened between the component of the gaming establishment management system supported by the EGM cabinet and the mobile device application (or between the component of the gaming establishment management system supported by the EGM cabinet, one or more servers and the mobile device application). This open communication channel enables the component of the gaming establishment management system supported by the EGM cabinet to send, though the NFC reader, additional data messages to the mobile device (or to the mobile device via one or more servers) which are responded to by the mobile device application of the mobile device.

It should be appreciated that as long as the mobile device remains within the NFC field, the component of the gaming establishment management system supported by the EGM cabinet is configured to communicate with the mobile device and send data, such as status updates, as necessary. However, once the mobile device is removed from the NFC field, the communication channel is closed and such status updates must be discontinued.

In other embodiments, the wireless interface implements a Wi-Fi, cellular and/or Bluetooth™ communications protocol to facilitate the insertion and removal of an electronic player tracking card (i.e., the logging in and logging out of the player from the player tracking system) and/or the transfer of funds between a cashless wagering account maintained for a player and an EGM.

In such embodiments, Bluetooth™ pairing occurs when two Bluetooth devices agree to communicate with each other and establish a connection. In order to pair two Bluetooth wireless devices, a password (passkey) is exchanged between the two devices. The Passkey is a code shared by both Bluetooth devices, which proves that both users have agreed to pair with each other. After the passkey code is exchanged, an encrypted communication can be set up between the pair devices. In Wi-Fi paring, every pairing can be set up with WPA2 encryption or another type of encryption scheme to keep the transfer private. Wi-Fi Direct is an example of a protocol that can be used to establish point-to-point communications between two Wi-Fi devices. The protocol enables for a Wi-Fi device pair directly with another without having to first join a local network.

It should be appreciated that Wi-Fi, cellular or Bluetooth™ communication protocols can be used in lieu of or in combination with NFC. For instance, an NFC communication can be used to instantiate a Wi-Fi or Bluetooth™ communication between the EGM, zero, one or more servers and a mobile device, such as secure pairing using one of these protocols. That is, in one embodiment, an NFC interface on an EGM can be used to set-up a higher speed communication between the EGM, zero, one or more servers and the NFC enabled mobile device. The higher speed communication rates can be used for expanded content sharing. For instance, a NFC and Bluetooth enabled EGM can be tapped by an NFC and Bluetooth enabled mobile device for instant Bluetooth pairing between the devices and zero, one or more servers. Instant Bluetooth pairing between an EGM, an NFC enabled mobile device and zero, one or more servers, can save searching, waiting, and entering codes. In another example, an EGM can be configured as an NFC enabled router, such as a router supporting a Wi-Fi communication standard. Tapping an NFC enabled mobile device to an NFC enabled and Wi-Fi enabled EGM can be used to establish a Wi-Fi connection between the devices and zero, one or more servers.

In certain embodiments which implement a Wi-Fi, cellular and/or Bluetooth™ communications protocol, the system utilizes one or more QR codes generated by the EGM to facilitate the communication of data between the mobile device and the system. In such embodiments, the QR code is used to identify the EGM that is displaying the QR code to identify the server to which the mobile device should connect. It should be appreciated that the QR code enables the system to establish a secure tunnel or path from the mobile device to the gaming establishment's Wi-Fi network and then to the gaming establishment's wired network and finally to the EGM. In these embodiments, a communication tunnel wrapper (i.e., a Wi-FiBluetooth™ tunnel wrapper) is utilized to establish a connection between the system and the mobile device and to transport any data messages described herein between the EGM, zero, one or more servers and the mobile device.

More specifically, in certain embodiments, the player requests, via an input at the EGM and/or the mobile device, the generation of a QR code by the EGM. In response to the player's request, the EGM or a player tracking unit displays a QR code. In certain embodiments, the QR code includes a nonce which prevents a third-party (e.g., another player) from sniping the player's login attempt. Such an on-demand QR code remains valid for a designated amount of time such that if the player does not scan the QR code within the designated amount of time, another QR code is necessary to be scanned to connect the mobile device to the EGM.

In these embodiments, following the prompting to cause the EGM or player tracking unit to display a QR code and the instructions with how to proceed to Card In via scanning the displayed QR code with the mobile device, the player scans the QR code with the mobile device application. If the system determines that the QR code is valid (i.e., not expired), the mobile device application will connect to the system. It should be appreciated that as long as the established connection between the mobile device and the system remains active, one or more system servers and mobile device may communicate data, such as status updates, as necessary. It should be further appreciated that in association with the Wi-Fi or Bluetooth™ or mobile device network communications protocol described herein, any action requested by the player via the mobile device application does not require a new engagement between the mobile device and the EGM, such as a new scanning of the QR code to send such a requested action from the mobile device to the EGM (or to send a requested action from the mobile device to one or more servers and then from one or more servers to the EGM).

In certain embodiments, following the scanning of a valid QR code, the mobile device application connects to one or more servers. Such servers use websockets secured with a transport layer security protocol or other similar mechanisms. In one such embodiment, the servers operate with one or more translators and zero, one or more components of the system, similarly using websockets secured with a transport layer security protocol, to communicate data to the EGM or a component of the EGM. It should be appreciated that in certain embodiments, one or more of the servers are scalable servers configured to scale to accept connections from thousands of mobile devices.

In certain embodiments, after establishing a connection with one or more servers, the mobile device application transmits a connect command to the system. In response to receiving a connect command from the mobile device, the system sends a message to the mobile device. This message serves to encapsulate various commands between the system and the mobile device. In these embodiments, if the mobile device application does not receive this message within a designated period of time, such as within five seconds, the mobile device application displays an error message to the player and directs the player to rescan the QR code.

In addition to the connect command communicated from the mobile device application to the system, the mobile device application of these embodiments is configured to send a disconnect command to the system. Such a disconnect command functions to tear-down the connection the server. That is, after the server receives the disconnect command from the mobile device application, the server sends this disconnect command to the translator and close the websocket to the mobile device application. In these embodiments, if the websocket is not closed or otherwise terminated within a designated period of time, such as five seconds, the mobile device application may retry communicating this command or close the websocket. It should be appreciated that if the mobile device connection is severed before this command is received by the system, the sever sends this command on behalf of the mobile device application;

In another embodiment, the mobile device application is configured to send a trigger command to the system, such as a component of the gaming establishment management system supported by the EGM cabinet. In this embodiment, the trigger command is associated with an action requested by the player, such as a transfer of funds to or from the EGM. In such embodiments, when the system receives the trigger command from the mobile device application, the system will communicate the appropriate requests to the mobile device application. If the mobile device application does not receive these requests within a designated amount of time, such as five seconds, the mobile device application will display an error message to the player and enable the player to retry the requested action.

In other embodiments, the mobile device application communicates with the system through a tunnel established over the mobile device's Wi-FI network or the mobile device's network connection. In such embodiments, the mobile device application will connect to one or more system servers which use websockets secured with a transport layer security protocol. The system server operates with one or more translators, similarly using websockets secured with a transport layer security protocol to communicate data to the EGM or a component of the EGM.

In certain embodiments which utilize the NFC communication protocol described herein, which utilize the Wi-Fi, cellular and/or Bluetooth™ communication protocols described herein and/or which utilize any other communication protocol described herein, any action requested by the player via the mobile device application requires a new engagement between the mobile device and the EGM, such as a new tap of the mobile device to a card reader or other designated location(s) of the EGM. In certain other embodiments which utilize the NFC communication protocol described herein, which utilize the Wi-Fi, cellular and/or Bluetooth™ communication protocols described herein and/or which utilize any other communication protocol described herein, certain actions requested by the player via the mobile device application requires a new engagement between the mobile device and the EGM, such as a new tap of the mobile device to a card reader or other designated location(s) of the EGM and other actions requested by the player via the mobile device application do not require any new engagement between the mobile device and the EGM.

Gaming Systems

The above-described embodiments of the present disclosure may be implemented in accordance with or in conjunction with one or more of a variety of different types of gaming systems, such as, but not limited to, those described below.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices.

Thus, in various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, the term "EGM" is used herein to refer to an electronic gaming machine (such as a slot machine, a video poker machine, a video lottery terminal (VLT), a video keno machine, or a video bingo machine located on a casino floor). Additionally, for brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the data network is a WAN, the gaming system includes a central server, central controller, or remote host and an EGM (or personal gaming device) each located in a different gaming establishment in a same geographic area, such as a same city or a same state. Gaming systems in which the data network is a WAN are substantially identical to gaming systems in which the data network is a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique username and password combination assigned to the player. The central server, central controller, or remote host may, however, identify the player in any other suitable manner, such as by validating a player tracking identification number associated with the player; by reading a player tracking card or other smart card inserted into a card reader (as described below); by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled “Internet Remote Game Server,” and U.S. Pat. No. 8,147,334, entitled “Universal Game Server”.

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

EGM Components

Figure 4:
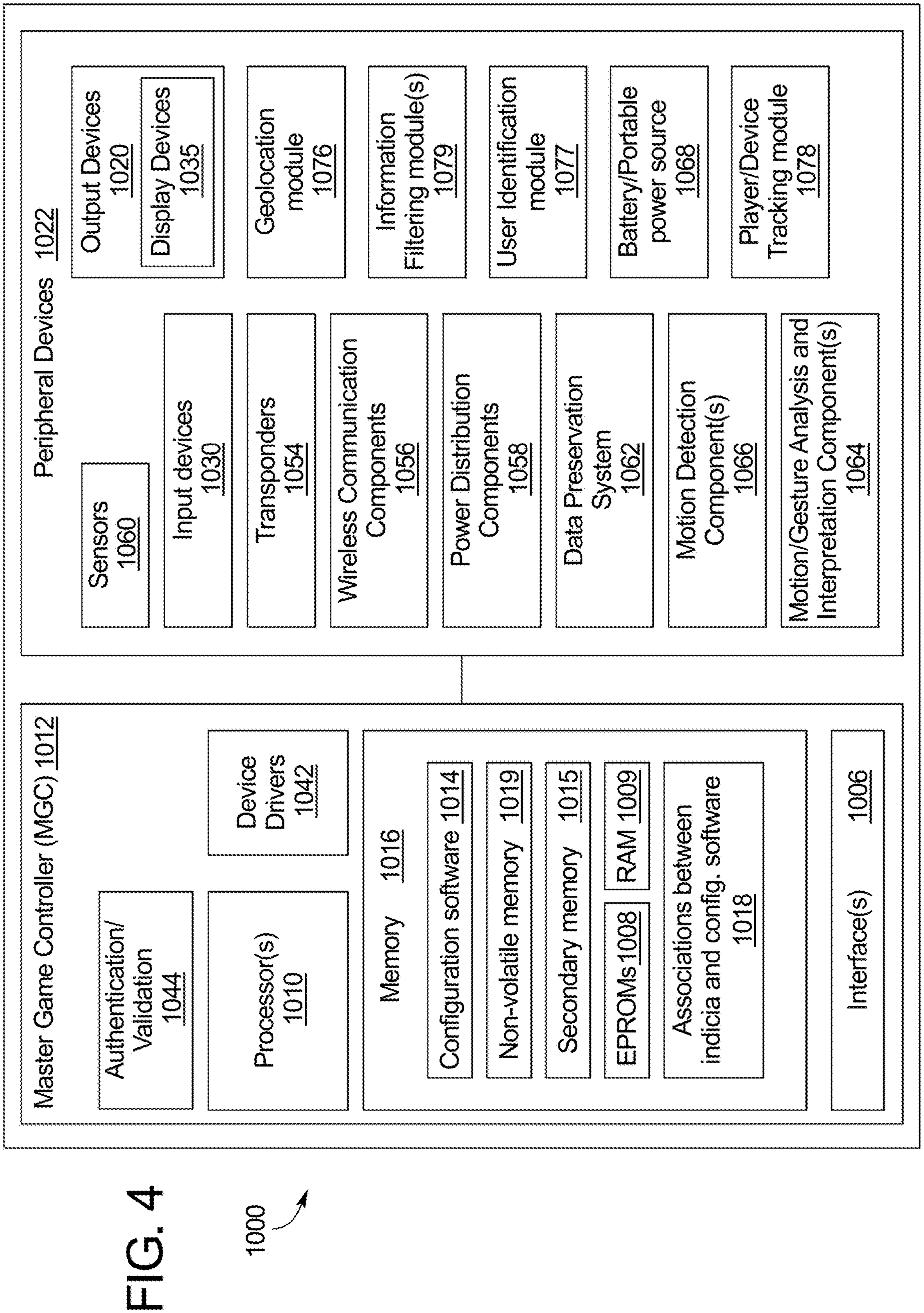
FIG. 4 is a schematic block diagram of one embodiment of an electronic configuration of an example gaming system disclosed herein.
Figure 5A:
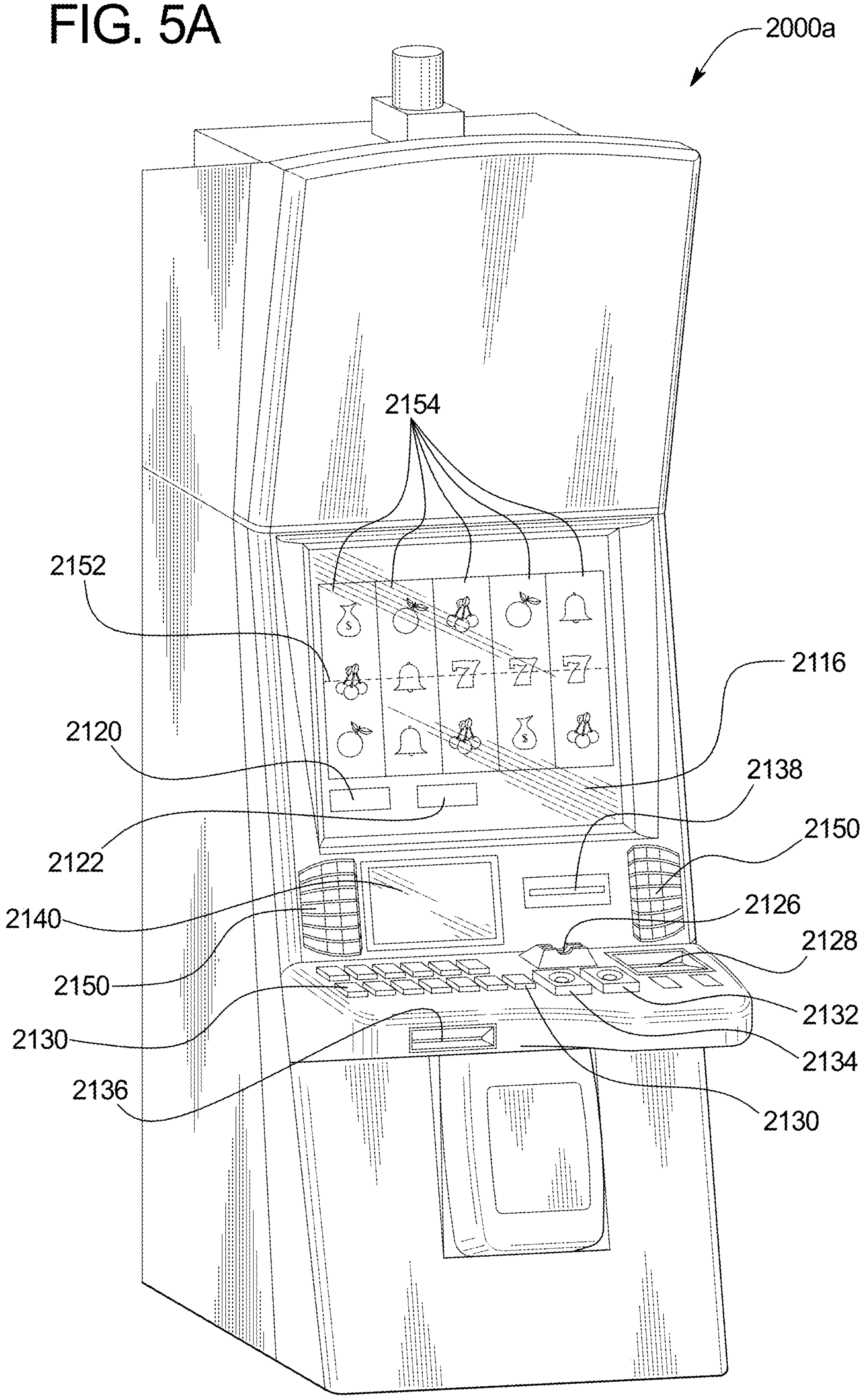
FIGS. 5A and 5B are perspective views of example alternative embodiments of the gaming system disclosed herein.
Figure 5B:
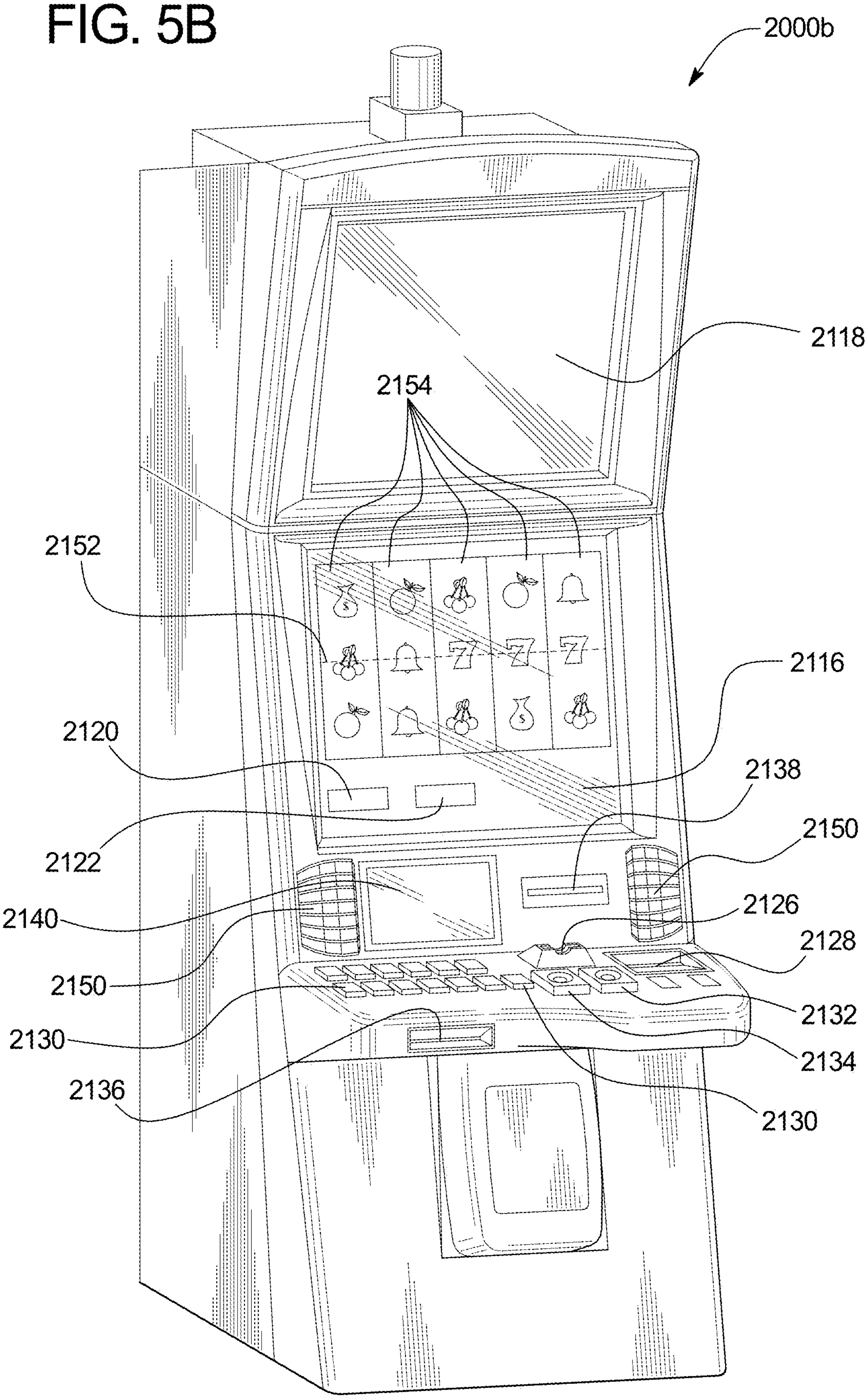

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices may includes some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM disclosed herein. In certain embodiments, the at least one memory device 1016 resides within the housing of the EGM (described below), while in other embodiments at least one component of the at least one memory device 1016 resides outside of the housing of the EGM.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc. Examples of various authentication and/or validation components are described in U.S. Pat. No. 6,620,047, entitled "Electronic Gaming Apparatus Having Authentication Data Sets".

In certain embodiments, the peripheral devices 1022 include several device interfaces, such as: (1) at least one output device 1020 including at least one display device

1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000*a* illustrated in FIG. 5A includes a central display device 2116, a player tracking display 2140, a credit display 2120, and a bet display 2122. The example EGM 2000*b* illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000*a* and 2000*b* illustrated in FIGS. 5A and 5B each include a ticket printer and dispenser 2136. Examples of ticket-in ticket-out (TITO) technology are described in U.S. Pat. No. 5,429,361, entitled "Gaming Machine Information, Communication and Display System"; U.S. Pat. No. 5,470,079, entitled "Gaming Machine Accounting and Monitoring System"; U.S. Pat. No. 5,265,874, entitled "Cashless Gaming Apparatus and Method"; U.S. Pat. No. 6,729,957, entitled "Gaming Method and Host Computer with Ticket-In/Ticket-Out Capability"; U.S. Pat. No. 6,729,958, entitled "Gaming System with Ticket-In/Ticket-Out Capability"; U.S. Pat. No. 6,736,725, entitled "Gaming Method and Host Computer with Ticket-In/Ticket-Out Capability"; U.S. Pat. No. 7,275,991, entitled "Slot Machine with Ticket-In/Ticket-Out Capability"; U.S. Pat. No. 6,048,269, entitled "Coinless Slot Machine System and Method"; and U.S. Pat. No. 5,290,003, entitled "Gaming Machine and Coupons".

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player. Examples of providing payment using virtual tickets are described in U.S. Pat. No. 8,613,659, entitled "Virtual Ticket-In and Ticket-Out on a Gaming Machine".

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000*a* and 2000*b* illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000*a* and 2000*b* illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. Examples of funding an EGM via communication between the EGM and a mobile device (such as a mobile phone) of a player are described in U.S. Patent Application Publication No. 2013/0344942, entitled "Avatar as Security Measure for Mobile Device Use with Electronic Gaming Machine". When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000*a* and 2000*b* illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices. U.S. Pat. No. 7,290,072 describes a variety of EGMs including one or more communication ports that enable the EGMs to communicate and operate with one or more external peripherals.

As generally described above, in certain embodiments, such as the example EGMs 2000*a* and 2000*b* illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000*a* and 2000*b* shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all gaming systems, and these example EGMs may not include one or more elements that are included in other gaming systems. For example, certain EGMs include a coin acceptor while others do not.

Operation of Primary or Base Games and/or Secondary or Bonus Games

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the gaming system includes a central server, central controller, or remote host and a changeable EGM, the at least one memory device of the central server, central controller, or remote host stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the central server, central controller, or remote host is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the central server, central controller, or remote host to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the gaming system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the gaming system generates the game outcome(s) and/or the award(s) to be provided based on the associated probabilities. In these embodiments, since the gaming system generates game outcomes and/or awards randomly or based on one or more probability calculations, there is no certainty that the gaming system will ever provide any specific game outcome and/or award.

In certain embodiments, the gaming system maintains one or more predetermined pools or sets of predetermined game outcomes and/or awards. In certain such embodiments, upon generation or receipt of a game outcome and/or award request, the gaming system independently selects one of the predetermined game outcomes and/or awards from the one or more pools or sets. The gaming system flags or marks the selected game outcome and/or award as used. Once a game outcome or an award is flagged as used, it is prevented from further selection from its respective pool or set; that is, the gaming system does not select that game outcome or award upon another game outcome and/or award request. The gaming system provides the selected game outcome and/or award. Examples of this type of award evaluation are described in U.S. Pat. No. 7,470,183, entitled "Finite Pool Gaming Method and Apparatus"; U.S. Pat. No. 7,563,163, entitled "Gaming Device Including Outcome Pools for Providing Game Outcomes"; U.S. Pat. No. 7,833,092, entitled "Method and System for Compensating for Player Choice in a Game of Chance"; U.S. Pat. No. 8,070,579, entitled "Bingo System with Downloadable Common Patterns"; and U.S. Pat. No. 8,398,472, entitled "Central Determination Poker Game".

In certain embodiments, the gaming system determines a predetermined game outcome and/or award based on the results of a bingo, keno, or lottery game. In certain such embodiments, the gaming system utilizes one or more bingo, keno, or lottery games to determine the predetermined game outcome and/or award provided for a primary game and/or a secondary game. The gaming system is provided or associated with a bingo card. Each bingo card consists of a matrix or array of elements, wherein each element is designated with separate indicia. After a bingo card is provided, the gaming system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards. Examples of this type of award determination are described in U.S. Pat. No. 7,753,774, entitled "Using Multiple Bingo Cards to Represent Multiple Slot Paylines and Other Class III Game Options"; U.S. Pat. No. 7,731,581, entitled "Multi-Player Bingo Game with Multiple Alternative Outcome Displays"; U.S. Pat. No. 7,955,170, entitled "Providing Non-Bingo Outcomes for a Bingo Game"; U.S. Pat. No. 8,070,579, entitled "Bingo System with Downloadable Common Patterns"; and U.S. Pat. No. 8,500,538, entitled "Bingo Gaming System and Method for Providing Multiple Outcomes from Single Bingo Pattern".

In certain embodiments in which the gaming system includes a central server, central controller, or remote host and an EGM, the EGM is configured to communicate with the central server, central controller, or remote host for monitoring purposes only. In such embodiments, the EGM determines the game outcome(s) and/or award(s) to be provided in any of the manners described above, and the central server, central controller, or remote host monitors the activities and events occurring on the EGM. In one such embodiment, the gaming system includes a real-time or online accounting and gaming information system configured to communicate with the central server, central controller, or remote host. In this embodiment, the accounting and gaming information system includes: (a) a player database configured to store player profiles, (b) a player tracking module configured to track players (as described below), and (c) a credit system configured to provide automated transactions. Examples of such accounting systems are described in U.S. Pat. No. 6,913,534, entitled "Gaming Machine Having a Lottery Game and Capability for Integration with Gaming Device Accounting System and Player Tracking System," and U.S. Pat. No. 8,597,116, entitled "Virtual Player Tracking and Related Services".

As noted above, in various embodiments, the gaming system includes one or more executable game programs executable by at least one processor of the gaming system to provide one or more primary games and one or more secondary games. The primary game(s) and the secondary game(s) may comprise any suitable games and/or wagering games, such as, but not limited to: electro-mechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the gaming system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the gaming system. In certain such embodiments, the gaming system includes one or more paylines associated with the reels. The example EGM 2000*b* shown in FIG. 5B includes a payline 1152 and a plurality of reels 1154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The gaming system enables a wager to be placed on one or more of such paylines to activate such paylines. In other embodiments in which one or more paylines are formed between at least two adjacent symbol display areas, the gaming system enables a wager to be placed on a plurality of symbol display areas, which activates those symbol display areas.

In various embodiments, the gaming system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the gaming system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided. Examples of ways to win award determinations are described in U.S. Pat. No. 8,012,011, entitled "Gaming Device and Method Having Independent Reels and Multiple Ways of Winning"; U.S. Pat. No. 8,241,104, entitled "Gaming Device and Method Having Designated Rules for Determining Ways To Win"; and U.S. Pat. No. 8,430,739, entitled "Gaming System and Method Having Wager Dependent Different Symbol Evaluations".

In various embodiments, the gaming system includes a progressive award. Typically, a progressive award includes an initial amount and an additional amount funded through a portion of each wager placed to initiate a play of a primary game. When one or more triggering events occurs, the gaming system provides at least a portion of the progressive award. After the gaming system provides the progressive award, an amount of the progressive award is reset to the initial amount and a portion of each subsequent wager is allocated to the next progressive award. Examples of progressive gaming systems are described in U.S. Pat. No. 7,585,223, entitled "Server Based Gaming System Having Multiple Progressive Awards"; U.S. Pat. No. 7,651,392, entitled "Gaming Device System Having Partial Progressive Payout"; U.S. Pat. No. 7,666,093, entitled "Gaming Method and Device Involving Progressive Wagers"; U.S. Pat. No. 7,780,523, entitled "Server Based Gaming System Having Multiple Progressive Awards"; and U.S. Pat. No. 8,337,298, entitled "Gaming Device Having Multiple Different Types of Progressive Awards".

As generally noted above, in addition to providing winning credits or other awards for one or more plays of the primary game(s), in various embodiments the gaming system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the gaming system automatically provides or initiates the secondary game upon the occurrence of a triggering event or the satisfaction of a qualifying condition. In other embodiments, the gaming system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a “BONUS” symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the gaming system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the gaming system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a “secondary game meter” configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple “buy-in.” For example, qualification through other specified activities is unsuccessful, payment of a fee or placement of an additional wager “buys-in” to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the gaming system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards. Examples of group gaming systems are described in U.S. Pat. No. 8,070,583, entitled “Server Based Gaming System and Method for Selectively Providing One or More Different Tournaments”; U.S. Pat. No. 8,500,548, entitled “Gaming System and Method for Providing Team Progressive Awards”; and U.S. Pat. No. 8,562,423, entitled “Method and Apparatus for Rewarding Multiple Game Players for a Single Win”.

In various embodiments, the gaming system includes one or more player tracking systems. Such player tracking systems enable operators of the gaming system (such as casinos or other gaming establishments) to recognize the value of customer loyalty by identifying frequent customers and rewarding them for their patronage. Such a player tracking system is configured to track a player’s gaming activity. In one such embodiment, the player tracking system does so through the use of player tracking cards. In this embodiment, a player is issued a player identification card that has an encoded player identification number that uniquely identifies the player. When the player’s playing tracking card is inserted into a card reader of the gaming system to begin a gaming session, the card reader reads the player identification number off the player tracking card to identify the player. The gaming system timely tracks any suitable information or data relating to the identified player’s gaming session. The gaming system also timely tracks when the player tracking card is removed to conclude play for that gaming session. In another embodiment, rather than requiring insertion of a player tracking card into the card reader, the gaming system utilizes one or more portable devices, such as a mobile phone, a radio frequency identification tag, or any other suitable wireless device, to track when a gaming session begins and ends. In another embodiment, the gaming system utilizes any suitable biometric technology or ticket technology to track when a gaming session begins and ends.

In such embodiments, during one or more gaming sessions, the gaming system tracks any suitable information or data, such as any amounts wagered, average wager amounts, and/or the time at which these wagers are placed. In different embodiments, for one or more players, the player tracking system includes the player’s account number, the player’s card number, the player’s first name, the player’s surname, the player’s preferred name, the player’s player tracking ranking, any promotion status associated with the player’s player tracking card, the player’s address, the player’s birthday, the player’s anniversary, the player’s recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device. Examples of player tracking systems are described in U.S. Pat. No. 6,722,985, entitled “Universal Player Tracking System”; U.S. Pat. No. 6,908,387, entitled “Player Tracking Communication Mechanisms in a Gaming Machine”; U.S. Pat. No. 7,311,605, entitled “Player Tracking Assembly for Complete Patron Tracking for Both Gaming and Non-Gaming Casino Activity”; U.S. Pat. No. 7,611,411, entitled “Player Tracking Instruments Having Multiple Communication Modes”; U.S. Pat. No. 7,617,151, entitled “Alternative Player Tracking Techniques"; and U.S. Pat. No. 8,057,298, entitled "Virtual Player Tracking and Related Services.

Web-Based Gaming

In various embodiments, the gaming system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination (or in any other manners described above.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer or by initiating creation of a paper check that is mailed to the player.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the gaming system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the gaming system includes a geo-fence system that enables tethered game play within a particular geographic area but not outside of that geographic area. Examples of tethering an EGM to a personal gaming device and geo-fencing are described in U.S. Patent Appl. Pub. No. 2013/0267324, entitled "Remote Gaming Method Allowing Temporary Inactivation Without Terminating Playing Session Due to Game Inactivity".

Social Network Integration

In certain embodiments, the gaming system is configured to communicate with a social network server that hosts or partially hosts a social networking website via a data network (such as the Internet) to integrate a player's gaming experience with the player's social networking account. This enables the gaming system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the gaming system to receive certain information from the social network server, such as the player's likes or dislikes or the player's list of connections. In certain embodiments, the gaming system enables the player to link the player's player account to the player's social networking account(s). This enables the gaming system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the gaming system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the gaming system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the gaming system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the gaming system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the gaming system enables the player to recommend a game to the player's connections by posting a recommendation to the player's wall (or other suitable area) of the social networking website.

Differentiating Certain Gaming Systems from General Purpose Computing Devices Certain of the gaming systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code. Examples of EGM code authentication are described in U.S. Pat. No. 6,962,530, entitled “Authentication in a Secure Computerized Gaming System”; U.S. Pat. No. 7,043,641, entitled “Encryption in a Secure Computerized Gaming System”; U.S. Pat. No. 7,201,662, entitled “Method and Apparatus for Software Authentication”; and U.S. Pat. No. 8,627,097, entitled “System and Method Enabling Parallel Processing of Hash Functions Using Authentication Checkpoint Hashes”.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to “re-trigger” the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device. Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player’s wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as “fault-tolerant” memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion. Examples of a state-based EGM, recovery from malfunctions, and game history are described in U.S. Pat. No. 6,804,763, entitled "High Performance Battery Backed RAM Interface"; U.S. Pat. No. 6,863,608, entitled "Frame Capture of Actual Game Play"; U.S. Pat. No. 7,111,141, entitled "Dynamic NV-RAM"; and U.S. Pat. No. 7,384,339, entitled, "Frame Capture of Actual Game Play".

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives. Examples of trusted memory devices are described in U.S. Pat. No. 6,685,567, entitled "Process Verification".

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected. Examples of trusted memory devices/sources are described in U.S. Pat. No. 7,515,718, entitled "Secured Virtual Network in a Gaming Environment".

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present. Examples of using a mass storage device are described in U.S. Pat. No. 6,149,522, entitled "Method of Authenticating Game Data Sets in an Electronic Casino Gaming System".

Various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:

a processor; and a memory device that stores a plurality of instructions that, when executed by the processor responsive to an occurrence of a virtual ticket voucher transfer event occurring in association with a first, unique identifier, cause the processor to:

cause a communication to a gaming establishment ticketing system of data associated with a virtual ticket voucher being transferred in association with the virtual ticket voucher transfer event, the communication resulting in updating a ticket voucher database maintained by the gaming establishment ticketing system to disassociate the virtual ticket voucher from the first, unique identifier and associate the virtual ticket voucher with a second, unique identifier, increase, based on a value associated with the virtual ticket voucher, a total value of virtual ticker vouchers transferred from being associated with the first, unique identifier during a predetermined period of time, and responsive to the total value of virtual ticker vouchers transferred from being associated with the first, unique identifier during the predetermined period of time at least reaching a threshold value associated with the predetermined period of time, cause a communication of data that results in a display device displaying a notification associated with the total value of virtual ticker vouchers transferred from being associated with the first, unique identifier during the predetermined period of time at least reaching the threshold value associated with the predetermined period of time.

2. The system of claim 1, wherein the first unique identifier is associated with a first mobile device and the second, unique identifier is associated with a second, different mobile device.

3. The system of claim 2, wherein the virtual ticket voucher transfer event occurs responsive to a receipt of data associated with an input being received by the first mobile device.

4. The system of claim 2, wherein the virtual ticket voucher transfer event occurs responsive to an authorization occurring separate from the first mobile device.

5. The system of claim 1, wherein the first unique identifier is associated with a first user and the second, unique identifier is associated with a second, different user.

6. The system of claim 1, wherein the virtual ticket voucher transfer event occurs responsive to a receipt of data associated with an input being received by a gaming establishment device.

7. The system of claim 1, wherein the total value of virtual ticker vouchers transferred from being associated with the first, unique identifier during the predetermined period of time comprises a total value of virtual ticker vouchers transferred from being associated with the first, unique identifier to being associated with the second, unique identifier.

8. A system comprising:

a processor; and a memory device that stores a plurality of instructions that, when executed by the processor responsive to an occurrence of a virtual ticket voucher transfer event occurring in association with a first, unique identifier, cause the processor to:

cause a communication to a gaming establishment ticketing system of data associated with a virtual ticket voucher being transferred in association with the virtual ticket voucher transfer event, the communication resulting in updating a ticket voucher database maintained by the gaming establishment ticketing system to disassociate the virtual ticket voucher from the first, unique identifier and associate the virtual ticket voucher with a second, unique identifier, increase, based on a value associated with the virtual ticket voucher, a total value of virtual ticker vouchers transferred to being associated with the second, unique identifier during a predetermined period of time, and responsive to the total value of virtual ticker vouchers transferred to being associated with the second, unique identifier during the predetermined period of time at least reaching a threshold value associated with the predetermined period of time, cause a communication of data that results in a display device displaying a notification associated with the total value of virtual ticker vouchers transferred to being associated with the second, unique identifier during the predetermined period of time at least reaching the threshold value associated with the predetermined period of time.

9. The system of claim 8, wherein the first unique identifier is associated with a first mobile device and the second, unique identifier is associated with a second, different mobile device.

10. The system of claim 9, wherein the virtual ticket voucher transfer event occurs responsive to a receipt of data associated with an input being received by the first mobile device.

11. The system of claim 9, wherein the virtual ticket voucher transfer event occurs responsive to an authorization occurring separate from the first mobile device.

12. The system of claim 8, wherein the first unique identifier is associated with a first user and the second, unique identifier is associated with a second, different user.

13. The system of claim 8, wherein the virtual ticket voucher transfer event occurs responsive to a receipt of data associated with an input being received by a gaming establishment device.

14. The system of claim 8, wherein the total value of virtual ticker vouchers transferred to being associated with the second, unique identifier during the predetermined period of time comprises a total value of virtual ticker vouchers transferred to being associated with the first, unique identifier from being associated with the first, unique identifier.

15. A method of operating a system, the method comprising:

responsive to an occurrence of a virtual ticket voucher transfer event occurring in association with a first, unique identifier:

communicating, to a gaming establishment ticketing system, data associated with a virtual ticket voucher being transferred in association with the virtual ticket voucher transfer event, the communication resulting in updating a ticket voucher database maintained by the gaming establishment ticketing system to disassociate the virtual ticket voucher from the first, unique identifier and associate the virtual ticket voucher with a second, unique identifier, increasing, by a processor and based on a value associated with the virtual ticket voucher, a total value of virtual ticker vouchers transferred from being associated with the first, unique identifier during a predetermined period of time, and responsive to the total value of virtual ticker vouchers transferred from being associated with the first, unique identifier during the predetermined period of time at least reaching a threshold value associated with the predetermined period of time, communicating data that results in a display device displaying a notification associated with the total value of virtual ticker vouchers transferred from being associated with the first, unique identifier during the predetermined period of time at least reaching the threshold value associated with the predetermined period of time.

16. The method of claim 15, wherein the first unique identifier is associated with a first mobile device and the second, unique identifier is associated with a second, different mobile device.

17. The method of claim 16, wherein the virtual ticket voucher transfer event occurs responsive to a receipt of data associated with an input being received by the first mobile device.

18. The method of claim 15, wherein the first unique identifier is associated with a first user and the second, unique identifier is associated with a second, different user.

19. The method of claim 15, wherein the virtual ticket voucher transfer event occurs responsive to a receipt of data associated with an input being received by a gaming establishment device.

20. The method of claim 15, wherein the total value of virtual ticker vouchers transferred from being associated with the first, unique identifier during the predetermined period of time comprises a total value of virtual ticker vouchers transferred from being associated with the first, unique identifier to being associated with the second, unique identifier.

* * * * *